(12) United States Patent
Bringer et al.

(10) Patent No.: US 10,230,724 B2
(45) Date of Patent: Mar. 12, 2019

(54) IDENTIFICATION METHOD OF AN ENTITY

(71) Applicant: Safran Identity & Security, Issy-les-Moulineaux (FR)

(72) Inventors: Julien Bringer, Issy les Moulineaux (FR); Roch Olivier Lescuyer De Chaptal-Lamure, Issy les Moulineaux (FR); Herve Chabanne, Issy les Moulineaux (FR); Eduardo Soria-Vazquez, Issy les Moulineaux (FR)

(73) Assignee: IDEMIA IDENTITY & SECURITY, Issy les Moulineaux (FR)

(*) Notice: Subject to any disclaimer, the term of this patent is extended or adjusted under 35 U.S.C. 154(b) by 192 days.

(21) Appl. No.: 15/353,633

(22) Filed: Nov. 16, 2016

(65) Prior Publication Data
US 2017/0142103 A1 May 18, 2017

(30) Foreign Application Priority Data
Nov. 16, 2015 (FR) .................... 15 60942

(51) Int. Cl.
*H04L 29/06* (2006.01)
*G06F 17/10* (2006.01)
(Continued)

(52) U.S. Cl.
CPC .......... *H04L 63/0861* (2013.01); *G06F 17/10* (2013.01); *G06F 21/32* (2013.01);
(Continued)

(58) Field of Classification Search
CPC .................................................. H04L 63/0861
(Continued)

(56) References Cited

U.S. PATENT DOCUMENTS

| | | | |
|---|---|---|---|
| 2009/0022374 A1* | 1/2009 | Boult | G06K 9/00885 382/119 |
| 2010/0317420 A1* | 12/2010 | Hoffberg | G06Q 30/0207 463/1 |

(Continued)

OTHER PUBLICATIONS

Ben-Sasson et al. "Secure Sampling of Public Parameters for Succinct Zero Knowledge Proofs" Sep. 25, 2015; 2015 IEEE Symposium on Security and Privacy, pp. 287-304 (Year: 2015).*

(Continued)

*Primary Examiner* — Khalil Naghdali
(74) *Attorney, Agent, or Firm* — Womble Bond Dickinson (US) LLP

(57) ABSTRACT

A biometric identification method of an entity including computation of a matching value between biometric data of an entity u and reference biometric data u', by application of a function F to the biometric data. A non-interactive, publicly verifiable computation method is performed wherein representation of the function is obtained by converting an arithmetic circuit into a polynomial representation. A matching value is obtained by evaluating the arithmetic circuit and the reference biometric data as inputs. Proof of correction of the computation execution of the matching values is obtained. Verification of said received proof. The function is encoded with an integer k>1 of a vector of a biometric datum on at least one input wire of the circuit. The function includes at least m scalar products. Evaluation of the circuit is iteratively computed depending on the value of m.

10 Claims, 12 Drawing Sheets

(51) Int. Cl.
   *G06F 21/32* (2013.01)
   *H04L 9/32* (2006.01)
   *H04L 9/08* (2006.01)

(52) U.S. Cl.
   CPC .......... *H04L 9/0869* (2013.01); *H04L 9/3218* (2013.01); *H04L 9/3231* (2013.01); *H04L 63/0442* (2013.01); *H04L 63/061* (2013.01); *H04L 2209/46* (2013.01); *H04L 2209/76* (2013.01)

(58) Field of Classification Search
   USPC .......................................................... 713/171
   See application file for complete search history.

(56) References Cited

U.S. PATENT DOCUMENTS

2016/0381003 A1* 12/2016 Caceres .............. H04L 63/0823 713/156
2017/0185761 A1* 6/2017 Stanwood ............... G06F 21/32

OTHER PUBLICATIONS

French Search Report with English Language Translation Cover Sheet dated Jul. 27, 2016, FR Application No. 1560942.
Anonymous, "Efficient Way to Multiply a Large Set of Small Numbers", Stack Overflow Site, Apr. 2014, pp. 5-8.
Barni, Mauro, et al., "Privacy Protection in Biometric-Based Recognition Systems: A Marriage between Cryptography and Signal Processing", IEEE Signal Processing Magazine, vol. 32, No. 5, Sep. 2015, pp. 70-76.
Bringer, Julien, et al., "Gshade: Faster Privacy-Preserving Distance Computation and Biometric Identification", Proceedings of the 2nd ACM Workshop on Information Hiding and Multimedia Security, IH&MMSEC '14, Jun. 2014, pp. 191-198.
Bringer, Julien, et al., "Privacy-Preserving Biometric Identification Using Secure Multiparty Computation: An Overview and Recent Trends", IEEE Signal Processing Magazine, IEEE Service Center, Piscataway, NJ, US, vol. 30, No. 2, Mar. 2013, pp. 46-52.
Bringer, Julien, et al., "Some Applications of Verifiable Computation to Biometric Verification", 2015 IEEE International Workshop on Information Forensics and Security (WIFS), IEEE, Nov. 2015, pp. 5-6.
Costello, Craig, et al., "Geppetto: Versatile Verifiable Computation", International Association for Cryptologic Research, vol. 20141201:093827, Nov. 2014, pp. 5-21.
Parno, Bryan, et al., "Pinnocchio: Nearly Practical Verifiable Computation", Security and Privacy (SP), 2013 IEEE Symposium on, IEEE, May 2013, pp. 238-252.
Upmanyu, Maneesh, et al., "Efficient Biometric Verification in Encrypted Domain", Advances in Biometrics, Springer Berlin Heidelberg, Berlin, Heidelberg, Jun. 2009, pp. 903-908.
Walfish, Michael, et al., "Verifying Computations without Reexecuting Them", Communications of the ACM, Association for Computing Machinery, Inc, United States, vol. 58, No. 2, Jan. 2015, pp. 78-84.

* cited by examiner

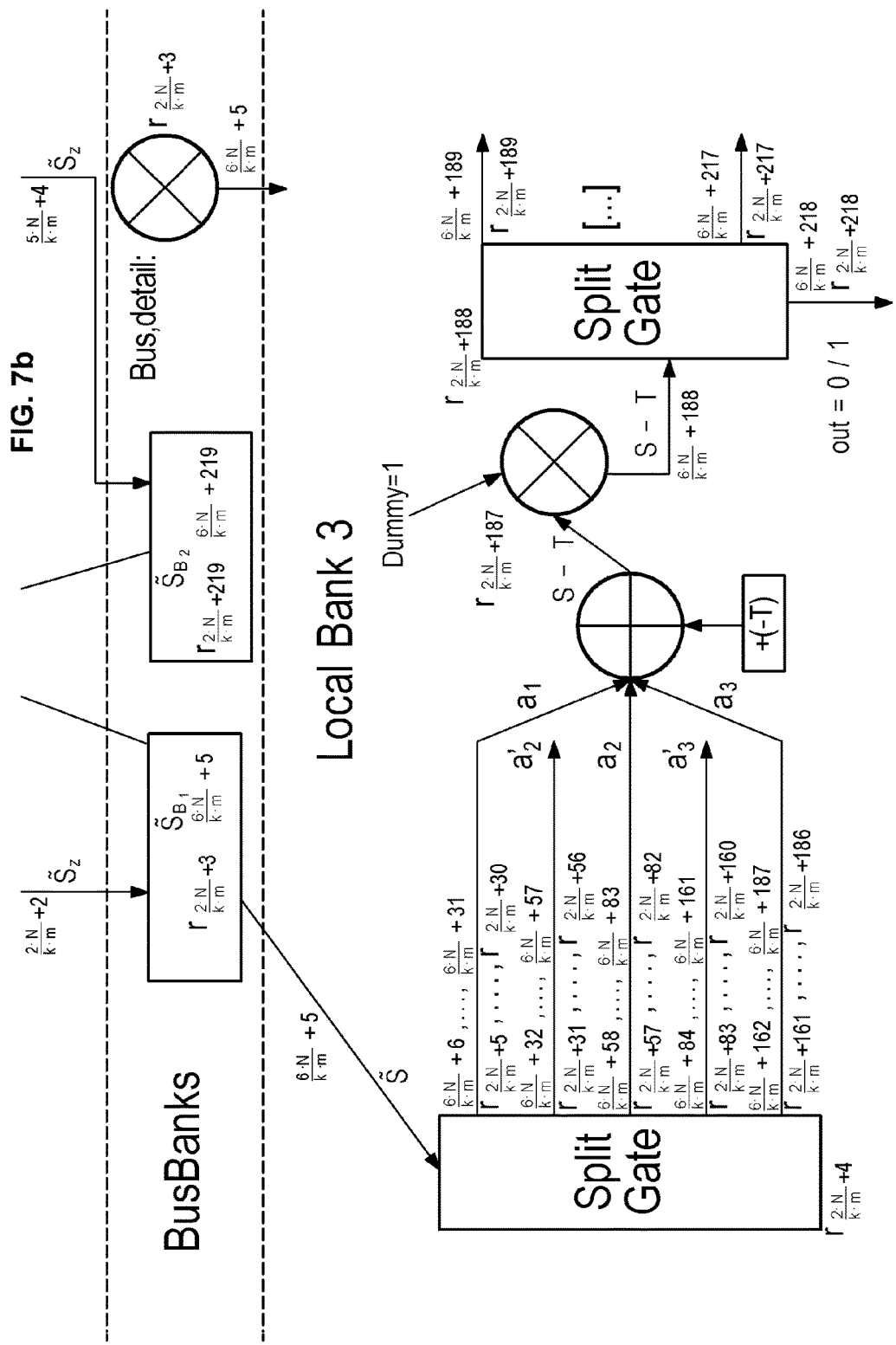

IDENTIFICATION METHOD OF AN ENTITY

GENERAL TECHNICAL FIELD

The present invention relates to the field of identification of an entity, individual or object. More precisely, it relates to a biometric identification method in which comparison to reference biometric data is delegated to a remote device in terms of a publicly verifiable computation protocol.

STATE OF THE ART

Due to increasing miniaturization of digital computation systems, from now on there is a wide range of digital devices fitted with variable computational power, including the smart card, the supercomputer, the smartphone and the personal computer. In such a scope it can be interesting for a device fitted with limited computational power to delegate costly computations to a remote device fitted with greater computational power. Such delegation in particular has been made easier recently by the development of high-speed communications networks and an offer to outsourced computations to the cloud.

But such delegation of computations raises the problem of the confidence which can be accorded to computation results transmitted by a remote executing party. Computation errors can in fact occur, also due to technical problems independent of the will of the executing party, due to the fact of voluntary and malicious action.

In this way, considerable efforts have been made to develop a computation protocol, called verifiable computation, letting a remote executing party prove to the device having ordered computation that the latter was executed correctly. For a long time however, developed protocols have remained applicable to specific functions only, or else remained unusable in practice due to the substantial number of computations necessary for the ordering party to verify proof supplied by the executing party.

The Pinocchio protocol presented in the publication "Bryan Parno, Craig Gentry, Jon Howell, and Mariana Raykova, Pinocchio: Nearly Practical Verifiable Computation, in Proceedings of the IEEE Symposium on Security and Privacy, IEEE, 21 May 2013" was one of the first verifiable computation protocols for the executing party to verifiably compute the application of any function and for the ordering party to verify the associated proof in a computation time less than that necessary for making the computation itself, allowing the ordering party to effectively take advantage of delegation of computation despite excess costs linked to verification of the proof.

The Pinocchio protocol has the major disadvantage of needing substantial computational power on the part of the executing party. The production cost of computation proof by this protocol is in fact greater by several orders of magnitude than that of the computation itself.

The Pinocchio protocol is based on transcription of the function to be evaluated in the form of an arithmetic circuit and construction of the corresponding quadratic arithmetic program (QAP). The computation cost rises with the number of multipliers in this arithmetic circuit. Such a number can rapidly become large, for example in the case where the function comprises a loop whereof each iteration must be represented explicitly by its own operators in the circuit. This limits the practical use of such a protocol to evaluation of very simple functions.

This protocol was then improved via the Geppetto protocol, presented in the publication "Craig Costello, Cedric Fournet, Jon Howell, Markulf Kohlweiss, Benjamin Kreuter, Michael Naehrig, Bryan Parno, and Samee Zahur, Geppetto: Versatile Verifiable Computation, in Proceedings of the IEEE Symposium on Security and Privacy, IEEE, 18 May 2015". This novel protocol of verifiable computation proposes cutting out the function to be evaluated into several sub-functions, optionally used several times for evaluation of the overall function, for example at each iteration of a loop. The proof of evaluation of this function can then be constructed from the less expensive proofs relative to evaluation of such sub-functions. The total arithmetic circuit can be substantially simplified relative to that of the Pinocchio protocol, considerably limiting the number of multipliers to be employed. The total production cost of the proof for the executing party is reduced relative to that of the Pinocchio protocol. The computation cost of a proof in terms of the Geppetto protocol continues to grow however with the number of multipliers necessary for representation of the function to be evaluated in the form of an arithmetic circuit. A bootstrapping technique has been introduced to improve the situation, but implementing this method degrades performance.

Many other derivatives of the Pinocchio protocol have been proposed, and there are varied applications in multiple technical fields. For example, the Cendrillon protocol presented in the publication "Antoine Delignat-Lavaud, Cedric Fournet, Markulf Kohlweiss and Bryan Parno, Cinderella: Turning Shabby X.509 Certificates into Elegant Anonymous Credentials with the Magic of Verifiable Computation, in 2016 IEEE Symposium on Security and Privacy", relates to the electronic signing of documents, and the PhotoProof protocol, presented in the publication "Assa Naveh, Eran Tromer, PhotoProof: cryptographic image authentication for any set of permissible transformations, proc. IEEE Symposium on Security & Privacy (Oakland) 2016, 255-271, IEEE, 2016" ensures that a photograph has been modified only according to a set of admissible transformations and has not been falsified.

Within the scope of biometric identification it is necessary to compare a biometric fingerprint to a multitude of reference biometric fingerprints, in a sufficiently short period to be supported by the individual to be identified. Such comparison between two biometric fingerprints each represented in the form of a vector u, respectively u', of N binary integers $u_i$ or $u'_i$, can be made by computing the scalar product $u \cdot u'$ between these two vectors. The arithmetic circuit corresponding to such a scalar product is represented in FIG. 1. It then comprises at least N multipliers each taking on input an integer $u_i$ and the corresponding integer $u'_i$. Such a number of multipliers implies a number of computations by the protocols described hereinabove too great to be realized in real time, making such protocols inadequate to use in terms of a biometric identification method.

There is therefore a need for a biometric identification method for delegating to a remote entity comparison of biometrics fingerprints in terms of a protocol of verifiable computation, for a cost of computation, production and verification of proof comprised, for execution in real time.

PRESENTATION OF THE INVENTION

The present invention proposes according to a first aspect a biometric identification method of an entity, by a biometric identification system comprising a client device and a remote computation device, comprising:
  computation of at least one matching value between at
    least one biometric datum of the entity u and at least one reference biometric datum u', by application of a function F to said biometric data, each of said data being a vector of N binary integers $u_i$ or $u'_i$ with $1 \leq i \leq N$, each integer being coded on n bits, said function comprising a scalar product between a biometric datum of the entity and a reference biometric datum, said computation performing a non-interactive, publicly verifiable computation method comprising steps of:

representation of said function in the form of an arithmetic circuit comprising wires transporting values of the finite prime field $\mathbb{Z}_q$, with q a prime number, and connecting addition and multiplication operators, conversion of said arithmetic circuit into a polynomial representation, QAP (Quadratic Arithmetic Program) or multi-QAP, generation of a public evaluation key and of a public verification key as a function of said polynomial representation, obtaining by the remote computation device of the arithmetic circuit and of the public evaluation key, for each biometric datum of the entity, determination of at least one matching value between said biometric datum and at least one reference biometric datum by the remote computation device by evaluating the arithmetic circuit having as inputs the biometric datum of the entity and the reference biometric datum, for each determined matching value, generation by the remote computation device of a proof of correction of the computation execution of the matching value, so-called generated proof, from said polynomial representation, the public evaluation key and the result of the evaluation of the arithmetic circuit, transmission by the remote computation device of said matching values and of said generated proofs to the client device, verification of said proofs received by the client device by means of the public verification key, identification of the entity by the client device as a function of the matching values and of the result of said verification of proofs, characterized in that:

representation of said function comprises encoding an integer k>1 of binary integers of a vector of a biometric datum on at least one input wire of the circuit, and the function F comprising at least m scalar products, m being a divisor of the length N of the biometric data vectors, if the divider m is equal to 2 or 3, the circuit comprises at least N/km multiplication operators connected to the input wires of the circuit, a storage memory, and at least one addition operator, and evaluation of the circuit iteratively comprises computation of each of the m scalar products by means of said N/km multiplication operators, storage of m results of computations of said scalar products in said storage memory and summation of said results by means of said addition operator, if the divider m is greater than or equal to 4, the circuit comprises at least one first computation sub-circuit of scalar product comprising N/km first multiplication operators connected to the input wires of the circuit and a first storage memory, and a second computation sub-circuit of scalar product comprising N/km second multiplication operators connected to the input wires of the circuit and a second storage memory, each of said sub-circuit being also connected to an output of the storage memory of the other sub-circuit, and evaluation of the circuit iteratively comprises computation of each of the m scalar products by using alternatively the first or the second sub-circuit to compute the sum of the scalar product of the values of the input wires of this sub-circuit and of the value stored in the storage memory of the other sub-circuit.

This lets the client device delegate computation of scalar products necessary for biometric identification of the entity, and verifies the exactitude of computations made by the remote device, all of this for moderate cost due to the reduced complexity of the circuits used to represent the function of scalar product. Such circuits in fact comprise around the order of k*m fewer multipliers than the circuit according to the state of the art.

The verification step of said received proofs can comprise batch verification of pairings.

In a first mode of operation, if the divider m of the length N of the biometric data vectors is equal to 1, given an asymmetric bilinear environment $(q, G_1, G_2, G_T, g_1, g_2, e)$ where q is a prime number, $G_1$, $G_2$ and $G_T$ three groups of order q, $g_1$ a generator of $G_1$, $g_2$ a generator of $G_2$, and e a non-degenerate bilinear pairing $e: G_1 \times G_2 \to G_T$ and the arithmetic circuit being represented in the form of a QAP of the circuit $Q=(t, V, W, Y)$ of size $\rho$ and degree $\delta$, with $V=\{vi\}$, $W=\{wi\}$, $Y=\{yi\}$, $0 \leq i \leq \rho$, and given $I_{io}=\{1, \ldots, \theta\}$ the set of indices corresponding to the input/output wires of the circuit and $I_{mid}=\{\theta+1, \ldots, \rho\}$ the set of indices of intermediate wires of the circuit not being input wires of the circuit, the generation step of a public evaluation key and a public verification key comprises:

generation of random variables $r_v$, $r_w$, $s$, $\alpha_v$, $\alpha_w$, $\alpha_y$, $\beta$, $\gamma$ in $\mathbb{Z}_q$, definition of coefficients $r_y = r_v \cdot r_w$, $g_{v1} = g_1^{r_v}$, $g_{w1} = g_1^{r_w}$, $g_{w2} = g_2^{r_w}$, $g_{y1} = g_1^{r_y}$ and $g_{y2} = g_2^{r_y}$, generation of the public evaluation key $EK_F$ equal to $(EK_{F1}, EK_{F2})$ where $$EK_{F1} = \begin{pmatrix} \{g_{v1}^{v_i(s)}\}_{i \in I_{mid}}, \{g_{w1}^{w_i(s)}\}_{i \in I_{mid}}, \{g_{y1}^{y_i(s)}\}_{i \in I_{mid}}, \\ \{g_{v1}^{\alpha_v \cdot v_i(s)}\}_{i \in I_{mid}}, \{g_{w1}^{\alpha_w \cdot w_i(s)}\}_{i \in I_{mid}}, \{g_{y1}^{\alpha_y \cdot y_i(s)}\}_{i \in I_{mid}}, \\ \{g_1^{s^i}\}_{i \in [1,\delta]}, \{g_{v1}^{\beta \cdot v_i(s)} \cdot g_{w1}^{\beta \cdot w_i(s)} \cdot g_{y1}^{\beta \cdot y_i(s)}\}_{i \in I_{mid}} \end{pmatrix}$$

$$EK_{F2} = \left(\{g_{w2}^{w_i(s)}\}_{i \in I_{mid}}\right)$$

generation of the public verification key $VK_F$ equal to $(VK_{F1}, VK_{F2})$ where:

$VK_{F1} = (g_1, \{g_{v1}^{v_i(s)}\}_{i \in [1,\theta]}, \{g_{y1}^{y_i(s)}\}_{i \in [1,\theta]})$ $VK_{F2} = (g_2, g_2^{\alpha_v}, g_2^{\alpha_w}, g_2^{\alpha_y}, g_2^{\gamma}, g_2^{\beta \cdot \gamma}, g_{y2}^{t(s)}, \{g_{w2}^{w_i(s)}\}_{i \in [1,\theta]})$ generation by the remote computation device of proof of correction of the computation execution of a matching value comprises, $\{c_i\}_{i \in [1,\rho]}$ being the set of values of the circuit determined during the determination step of the matching value:

determination of a polynomial $h(x)$ such that $p(x)=h(x) \cdot t(x)$ with $p(x)=(v_0(x)+\Sigma_{i=1}^{\rho} c_i \cdot v_i(x)) \cdot (w_0(x)+\Sigma_{i=1}^{\rho} c_i \cdot w_i(x)) - (y_0(x)+\Sigma_{i=1}^{\rho} c_i \cdot y_i(x))$, computation of the generated proof $\pi=(\pi_1, \pi_2)$ with:

$$\pi_1 = \begin{pmatrix} g_{v1}^{v_{mid}(s)}, g_{w1}^{w_{mid}(s)}, g_{y1}^{y_{mid}(s)}, g_1^{h(s)}, \\ g_{v1}^{\alpha_v \cdot v_{mid}(s)}, g_{w1}^{\alpha_w \cdot w_{mid}(s)}, g_{y1}^{\alpha_y \cdot y_{mid}(s)}, \\ g_{v1}^{\beta \cdot v_{mid}(s)}, g_{w1}^{\beta \cdot w_{mid}(s)}, g_{y1}^{\beta \cdot y_{mid}(s)} \end{pmatrix}$$

$$\pi_2 = \left(g_{w2}^{w_{mid}(s)}\right)$$

where:

$v_{mid}(x) = \Sigma_{i \in I_{mid}} c_i \cdot v_i(x), w_{mid}(x) = \Sigma_{i \in I_{mid}} c_i \cdot w_i(x)$ and $y_{mid}(x) = \Sigma_{i \in I_{mid}} c_i \cdot y_i(x),$ and, wherein said proofs received by the client device being equal to $(\pi_{r1}, \pi_{r2})$ with $\pi_{r1}$ in the form of: $(g_{v1}^{V'_{mid}}, g_{w1}^{W'_{mid}}, g_{y1}^{Y'_{mid}}, g_1^{H}, g_{v1}^{V'_{mid}}, g_{w1}^{W'_{mid}}, g_{y1}^{Y'_{mid}}, g_1^{Z})$ and $\pi_{r2}$ in the form $g_{w2}^{W'_{mid}}$, verification of a received proof comprises performing the following equality tests:

$e(g_{v1}^{v_0(s)} \cdot g_{v1}^{v_{io}(s)} \cdot g_{v1}^{V'_{mid}}, g_{w2}^{w_0(s)} \cdot g_{w2}^{w_{io}(s)} \cdot g_{w2}^{W'_{mid}}) = e(g_1^{H}, g_{y2}^{t(s)}) \cdot e(g_{y1}^{y_0(s)} \cdot g_{y1}^{y_{io}(s)} \cdot g_{y1}^{Y'_{mid}}, g_2),$ $e((g_{v1}^{V'_{mid}})^{d_1} \cdot (g_{w1}^{W'_{mid}})^{d_2} \cdot (g_{y1}^{Y'_{mid}})^{d_3}, g_2) = e((g_{v1}^{V'_{mid}})^{d_1}, g_2^{\alpha_v}) \cdot e((g_{w1}^{W'_{mid}})^{d_2}, g_2^{\alpha_w}) \cdot e((g_{y1}^{Y'_{mid}})^{d_3}, g_2^{\alpha_y}),$ $e((g_1^{Z}, g_2^{\gamma}) = e(g_{v1}^{V'_{mid}} \cdot g_{w1}^{W'_{mid}} \cdot g_{y1}^{Y'_{mid}}, g_2^{\beta \gamma})$ where $g_{v1}^{v_{io}(s)} = \Pi_{i=1}^{\theta}(g_{v1}^{v_i(s)})^{c_i}$, $g_{w1}^{w_{io}(s)} = \Pi_{i=1}^{\theta}(g_{w1}^{w_i(s)})^{c_i}$, and $g_{y1}^{y_{io}(s)} = \Pi_{i=1}^{\theta}(g_{y1}^{y_i(s)})^{c_i}$ and $(d_1, d_2, d_3)$ elements of $\mathbb{Z}_q$ on $\lambda$ bits with $\lambda$ a security parameter.

Verification of the proof of computation is accelerated relative to the Pinocchio protocol, by way of simultaneous verification of several pairings.

In a second mode of operation, if the divider m of the length N of the biometric data vectors is greater than or equal to 2, given an asymmetric bilinear environment $(q, G_1, G_2, G_T, g_1, g_2, e)$ where q is a prime number, $G_1$, $G_2$ and $G_T$ three groups of order q, $g_1$ a generator of $G_1$, $g_2$ a generator of $G_2$, and e a non-degenerate bilinear pairing e: $G_1 \times G_2 \to G_T$, the arithmetic circuit being represented in the form of a multi-QAP $Q=(\{B_b\}_{b \in [1,l]}, t, V, W, Y)$ of size $\rho$ and degree $\delta$, with $\{B_b\}_{b \in [1,l]}$ a set of l banks $B_b$ of Q used in computation of the function F, and $V=\{vi\}$, $W=\{wi\}$, $Y=\{yi\}$ with $0 \leq i \leq \rho$, the generation step of a public evaluation key and a public verification key comprises:

generation of random variables $s, \{(\alpha_{bv}, \alpha_{bw}, \alpha_{by}, \beta_b, \gamma_b)\}_{b \in [1,l]}, r_v, r_w$ in $\mathbb{Z}_q$, definition of the following coefficients: $r_y = r_b \cdot r_w$, $g_{v1} = g_1^{r_v}$, $g_{v2} = g_2^{r_v}$, $g_{w1} = g_1^{r_w}$, $g_{w2} = g_2^{r_w}$, $g_{y1} = g_1^{r_y}$ and $g_{y2} = g_2^{r_y}$, generation of the public evaluation key $EK_F$ equal to:

$(\{EK_{Fb}\}_{b \in [1,l]}, \{g_1^{s^i}\}_{i \in [1,\delta]}, g_{v1}^{t(s)}, g_{w1}^{t(s)}, g_{y1}^{t(s)}, g_{v2}^{t(s)}, g_{w2}^{t(s)}, g_{y2}^{t(s)})$ where each public bank key $EK_{Fb}$ is equal to $(EK_{Fb1}, EK_{Fb2})$ with:

$$EK_{Fb1} = \begin{pmatrix} \{g_{v1}^{v_i(s)}, g_{w1}^{w_i(s)}, g_{y1}^{y_i(s)}, g_{v1}^{\alpha_{bv} \cdot v_i(s)}, g_{w1}^{\alpha_{bw} \cdot w_i(s)}, g_{y1}^{\alpha_{by} \cdot y_i(s)}, \\ g_{v1}^{\beta_b \cdot v_i(s)} \cdot g_{w1}^{\beta_b \cdot w_i(s)} \cdot g_{y1}^{\beta_b \cdot y_i(s)} \}_{i \in B_b} \\ g_{v1}^{\alpha_{bv} \cdot t(s)}, g_{w1}^{\alpha_{bw} \cdot t(s)}, g_{y1}^{\alpha_{by} \cdot t(s)}, g_{v1}^{\beta_b \cdot t(s)} \cdot g_{w1}^{\beta_b \cdot t(s)} \cdot g_{y1}^{\beta_b \cdot t(s)} \end{pmatrix}$$

$$EK_{Fb2} = \left(\{g_{w2}^{w_i(s)}\}_{i \in \beta_b}, g_{w2}^{\alpha_{bw} \cdot t(s)}\right)$$

generation of the public verification key $VK_F$ equal to: $(\{VK_{Fb}\}_{b \in [1,l]}, g_1, g_2, g_{y2}^{t(s)})$ where each public bank key $VK_{Fb}$ is equal to $(g_2^{\alpha_{bv}}, g_2^{\alpha_{bw}}, g_2^{\alpha_{by}}, g_2^{\gamma_b}, g_2^{\beta_b \cdot \gamma_b})$ determination of a matching value comprises, function F being divided into $\omega$ sub-functions $F_1, \ldots, F_\omega$ and $\sigma = ((f_l, (T_{l1}, \ldots, T_{ll})))_{l \in [1,L]}$ being a scheduling of length L with $f_l \in \{1, \ldots, \omega\}$, evaluation of each sub-function $F_\omega$ from the biometric data of the entity and the reference biometric data and determination of the values i of the circuit, generation by the remote computation device of proof of correction of the computation execution of a matching value comprises, for each $l = \{1, \ldots, L\}$:

for each bank $B_b$ such that $b \in \Lambda$, with $\Lambda \subseteq [1,l]$ the set of indices $b \in [1,l]$ such that $T_{lb} \neq 0, \Gamma = \cup_{b \in \Lambda} B_b, \{c_j\}_{j \in B_b}$ an instance of the bank $B_b$, $\Delta = \{c_i\}_{i \in \Gamma}$ the set of values of $\Gamma$:

generation of pledging random variables in $\mathbb{Z}_q$: $o_b = (o_{bv}, o_{bw}, o_{by})$, computation of a digest $D_b$ equal to $(D_{b1}, D_{b2})$ from the instance of the bank of variables $B_b$: $B_b^{(T_{lb})} = \{c_i \in \Delta\}_{i \in B_b}$ and pledging random variables $o_b$ and such that:

if the bank $B_b$ is an input/output bank:

$D_{b1} = (g_{v1}^{v^{(b)}(s)}, g_{y1}^{y^{(b)}(s)})$ and $D_{b2} = (g_{w2}^{w^{(b)}(s)})$, if the bank $B_b$ is not an input/output bank:

$$D_{b1} = \begin{pmatrix} g_{v1}^{v^{(b)}(s)}, g_{w1}^{w^{(b)}(s)}, g_{y1}^{y^{(b)}(s)}, g_{v1}^{\alpha_{bv} \cdot v^{(b)}(s)}, g_{w1}^{\alpha_{bw} \cdot w^{(b)}(s)}, g_{y1}^{\alpha_{by} \cdot y^{(b)}(s)} \\ g_{v1}^{\beta_b \cdot v^{(b)}(s)} \cdot g_{w1}^{\beta_b \cdot w^{(b)}(s)} \cdot g_{y1}^{\beta_b \cdot y^{(b)}(s)} \end{pmatrix}$$

$$D_{b2} = \left(g_{w2}^{w^{(b)}(s)}\right)$$

with:

$v^{(b)}(s) = \Sigma_{i \in B_b} c_i \cdot v_i(s) + o_{bv} \cdot t(s),$ $w^{(b)}(s) = \Sigma_{i \in B_b} c_i \cdot w_i(s) + o_{bw} \cdot t(s),$ $y^{(b)}(s) = \Sigma_{i \in B_b} c_i \cdot y_i(s) + o_{by} \cdot t(s),$ determination of a polynomial $h^{(l)}(x)$ such that $p^{(l)}(x) = h^{(l)}(x) \cdot t(x)$ with $p^{(l)}(x) = (v_0(x) + \Sigma_{i \in \Gamma} c_i \cdot v_i(x) + \Sigma_{b \in \Lambda} o_{bv} \cdot t(x)) \cdot (w_0(x) + \Sigma_{i \in \Gamma} c_i \cdot w_i(x) + \Sigma_{b \in \Lambda} o_{bw} \cdot t(x)) - (y_0(x) + \Sigma_{i \in \Gamma} c_i \cdot y_i(x) + \Sigma_{b \in \Lambda} o_{by} \cdot t(x))$ computation of a proof element $\pi^{(l)}$ equal to $g_1^{h^{(l)}(s)}$, and, wherein said proofs received by the client device being of the form $D_1^{(1)}, \ldots, D_l^{(1)}, \pi^{(1)}, \ldots, D_1^{(L)}, \ldots, D_l^{(L)}, \pi^{(L)}$ where for all $l \in \{1, \ldots, L\}$ and $b \in \{1, \ldots, l\}$:

$$D_b^{(l)} = \left(\left(g_{v1}^{V_b^{(l)}}, g_{w1}^{W_b^{(l)}}, g_{y1}^{Y_b^{(l)}}, g_{v1}^{V_b'^{(l)}}, g_{w1}^{W_b'^{(l)}}, g_{y1}^{Y_b'^{(l)}}, g_1^{Z_b^{(l)}}\right), \left(g_{w2}^{W_b^{(l)}}\right)\right)$$

and $\pi^{(l)} = g_1^{H^{(l)}}$, verification of a received proof (E8) comprises:

verification of L·l digests, for $l \in \{1, \ldots, L\}$ and $b \in \{1, \ldots, l\}$ comprising performing the following equality tests:

$$e\left(g_{v1}^{v_b'^{(l)}}, g_2^{\alpha_{bv}}\right) = e\left(g_{v1}^{v_b^{(l)}}, g_2\right)$$

$$e\left(g_{w1}^{w_b'^{(l)}}, g_2^{\alpha_{bw}}\right) = e\left(g_{w1}^{w_b^{(l)}}, g_2\right)$$

$$e\left(g_{y1}^{y_b'^{(l)}}, g_2^{\alpha_{by}}\right) = e\left(g_{y1}^{y_b^{(l)}}, g_2\right)$$

$$e\left(g_1^{Z_b^{(l)}}, g_2^{\gamma_b}\right) = e\left(g_{v1}^{v_b^{(l)}} \cdot g_{w1}^{w_b^{(l)}} \cdot g_{y1}^{y_b^{(l)}}, g_2^{\beta_b \cdot \gamma_b}\right)$$

verification of L proofs comprising for $l \in \{1, \ldots, L\}$ performing the following equality test:

$$e\left(\prod_{b=1}^{l'}\left(g_{v1}^{v_b^{(l)}}\right), \prod_{b=1}^{l'}\left(g_{w2}^{w_b^{(l)}}\right)\right) = e\left(g_1^{H^{(l)}}, g_{y2}^{t(s)}\right) \cdot e\left(\prod_{b=1}^{l'}\left(g_{y1}^{y_b^{(l)}}\right), g_2\right)$$

Verification of the proof of computation is accelerated relative to the Geppetto protocol, by way of simultaneous verification of several pairings.

In a third mode of operation, if the divider m of the length N of the biometric data vectors is greater than or equal to 2, given an asymmetric bilinear environment (q, $G_1$, $G_2$, $G_T$, $g_1$, $g_2$, e) where q is a prime number $G_1$, $G_2$ and $G_T$ three groups of order q, $g_1$ a generator of $G_1$, $g_2$ a generator of $G_2$, and e a non-degenerate bilinear pairing e: $G_1 \times G_2 \to G_T$, the arithmetic circuit being represented in the form of a multi-QAP $Q = (\{B_b\}_{b \in [1,l]}, t, V, W, Y)$ of size $\rho$ and degree $\delta$, with $\{B_b\}_{b \in [1,l]}$ a set of l banks $B_b$ of Q used in computation of the function F, and V={vi}, W={wi}, Y={yi} with $0 \le i \le \rho$, generation step of a public evaluation key and a public verification key comprises:
generation of random variables s, $\{(\alpha_{bv}, \alpha_{bw}, \alpha_{by}, \beta_b, \gamma_b)\}_{b \in [1,l]}$, $r_v$, $r_w$ in $\mathbb{Z}_q$,
definition of the following coefficients: $r_y = r_v \cdot r_w$, $g_{v1} = g_1^{r_v}$, $g_{v2} = g_2^{r_v}$, $g_{w1} = g_1^{r_w}$, $g_{w2} = g_2^{r_w}$, $g_{y1} = g_1^{r_y}$ and $g_{y2} = g_2^{r_y}$,
generation of the public evaluation key $EK_F$ equal to:

$$(\{EK_{Fb}\}_{b \in [1,l]}, \{g_1^{s^i}\}_{i \in [1,\delta]}, g_{v1}^{t(s)}, g_{w1}^{t(s)}, g_{y1}^{t(s)}, g_{v2}^{t(s)}, g_{w2}^{t(s)}, g_{y2}^{t(s)})$$

where each public bank key $EK_{Fb}$ is equal to ($EK_{Fb1}$, $EK_{Fb2}$) with:

$$EK_{Fb1} = \begin{pmatrix} \left\{ g_{v1}^{v_i(s)}, g_{w1}^{w_i(s)}, g_{y1}^{y_i(s)}, g_{v1}^{\alpha_{bv} \cdot v_i(s)}, g_{w1}^{\alpha_{bw} \cdot w_i(s)}, g_{y1}^{\alpha_{by} \cdot y_i(s)}, \\ g_{v1}^{\beta_b \cdot v_i(s)} \cdot g_{w1}^{\beta_b \cdot w_i(s)} \cdot g_{y1}^{\beta_b \cdot y_i(s)} \right\}_{i \in B_b}, \\ g_{v1}^{\alpha_{bv} \cdot t(s)}, g_{w1}^{\alpha_{bw} \cdot t(s)}, g_{y1}^{\alpha_{by} \cdot t(s)}, g_{v1}^{\beta_b \cdot t(s)}, g_{w1}^{\beta_b \cdot t(s)}, g_{y1}^{\beta_b \cdot t(s)} \end{pmatrix}$$

$$EK_{Fb2} = \left(\left\{g_{w2}^{w_i(s)}\right\}_{i \in B_b}, g_{w2}^{\alpha_{bw} \cdot t(s)}\right)$$

generation of the public verification key $VK_F$ equal to: $(\{VK_{Fb}\}_{b \in [1,l]}, g_1, g_2, g_{y2}^{t(s)})$ where each public bank key $VK_{Fb}$ is equal to $(g_2^{\alpha_{bv}}, g_2^{\alpha_{bw}}, g_2^{\alpha_{by}}, g_2^{\gamma_b}, g_2^{\beta_b \cdot \gamma_b})$, determination of a matching value comprises, function F being divided into $\omega$ sub-functions $F_1, \ldots, F_\omega$ and $\sigma = ((f_l, (T_{l1}, \ldots, T_{ll})))_{l \in [1,L]}$ being a scheduling of length L with $f_l \in \{1, \ldots, \omega\}$, evaluation of each sub-function $F_\omega$ from the biometric data of the entity and the reference biometric data and determination of the values of the circuit, generation by the remote computation device of proof of correction of the computation execution of a matching value comprises, for each $l = \{1, \ldots, L\}$:
for each bank $B_b$ such that $b \in \Lambda$, with $\Lambda \subseteq [1,l]$ the set of indices $b \in [1,l]$ such that $T_{lb} \ne 0$, $\Gamma = \cup_{b \in \Lambda} B_b$, $\{c_j\}_{j \in B}$ an instance of the bank $B_b$, $\Delta = \{c_i\}_{i \in \Gamma}$ the set of values of r:
generation of pledging random variables in $\mathbb{Z}_q$: $o_b = (o_{bv}, o_{bw}, o_{by})$,
computation of a digest $D_b$ equal to $(D_{b1}, D_{b2})$ from the instance of the bank of variables $B_b$: $B_b^{(T_{lb})} = \{c_i \in \Delta\}_{i \in B_b}$ and pledging random variables $o_b$ and such that:
if the bank $B_b$ is an input/output bank: $D_{b1} = (g_{v1}^{v^{(b)}(s)}, g_{y1}^{y^{(b)}(s)})$ and $D_{b2} = (g_{w2}^{w^{(b)}(s)})$.
if the bank $B_b$ is not an input/output bank:

$$D_{b1} = \begin{pmatrix} g_{v1}^{v^{(b)}(s)}, g_{w1}^{w^{(b)}(s)}, g_{y1}^{y^{(b)}(s)}, g_{v1}^{\alpha_{bv} \cdot v^{(b)}(s)}, g_{w1}^{\alpha_{bw} \cdot w^{(b)}(s)}, g_{y1}^{\alpha_{by} \cdot y^{(b)}(s)}, \\ g_{v1}^{\beta_b \cdot v^{(b)}(s)} \cdot g_{w1}^{\beta_b \cdot w^{(b)}(s)} \cdot g_{y1}^{\beta_b \cdot y^{(b)}(s)} \end{pmatrix}$$

$$D_{b2} = \left(g_{w2}^{w^{(b)}(s)}\right)$$

with:

$v^{(b)}(s) = \Sigma_{i \in B_b} c_i \cdot v_i(s) + o_{bv} \cdot t(s)$, $w^{(b)}(s) = \Sigma_{i \in B_b} c_i \cdot w_i(s) + o_{bw} \cdot t(s)$, $y^{(b)}(s) = \Sigma_{i \in B_b} c_i \cdot y_i(s) + o_{by} \cdot t(s)$, determination of a polynomial $h^{(l)}(x)$ such that $p^{(l)}(x) = h^{(l)}(x) \cdot t(x)$ with $p^{(l)}(x) = (v_0(x) + \Sigma_{i \in \Gamma} c_i \cdot v_i(x) + \Sigma_{b \in \Lambda} o_{bv} \cdot t(x)) \cdot (w_0(x) + \Sigma_{i \in \Gamma} c_i \cdot w_i(x) + \Sigma_{b \in \Lambda} o_{bw} \cdot t(x)) - (y_0(x) + \Sigma_{i \in \Gamma} c_i \cdot y_i(x) + \Sigma_{b \in \Lambda} o_{by} \cdot t(x))$
computation of a proof element $\pi^{(l)}$ equal to $g_1^{h^{(l)}(s)}$,
and, wherein said proofs received by the client device being of the form $D_1^{(1)}, \ldots, D_l^{(1)}, \pi^{(1)}, \ldots, D_1^{(L)}, \ldots, D_l^{(L)}, \pi^{(L)}$ where for all $l \in \{1, \ldots, L\}$ and $b \in \{1, \ldots, l\}$:

$$D_b^{(l)} = \left(\left(g_{v1}^{v_b^{(l)}}, g_{w1}^{w_b^{(l)}}, g_{y1}^{y_b^{(l)}}, g_{v1}^{v_b'^{(l)}}, g_{w1}^{w_b'^{(l)}}, g_{y1}^{y_b'^{(l)}}, g_1^{Z_b^{(l)}}\right), \left(g_{w2}^{w_b^{(l)}}\right)\right)$$

and
$\pi^{(l)} = g_1^{H^{(l)}}$, verification of a received proof comprises, given a correction parameter $\lambda$:
selection of a random vector $(d_1, \ldots, d_{3 \cdot l})$ of elements of size $\lambda$,
batch verification of $L \cdot l$ digests comprising performing l times the following equality tests, for $b \in \{1, \ldots, l\}$:

$$e\left(\prod_{l=1}^{L}\left(g_{v1}^{v_b'^{(l)}}\right)^{d_l}, g_2^{\alpha_{bv}}\right) \cdot$$

$$e\left(\prod_{l=1}^{L}\left(g_{w1}^{w_b'^{(l)}}\right)^{d_{L+l}}, g_2^{\alpha_{bw}}\right) \cdot e\left(\prod_{l=1}^{L}\left(g_{y1}^{y_b'^{(l)}}\right)^{d_{2 \cdot L+l}}, g_2^{\alpha_{by}}\right) =$$

$$e\left(\prod_{l=1}^{L}\left(g_{v1}^{v_b^{(l)}}\right)^{d_l} \cdot \prod_{l=1}^{L}\left(g_{w1}^{w_b^{(l)}}\right)^{d_{L+l}} \cdot \prod_{l=1}^{L}\left(g_{y1}^{y_b^{(l)}}\right)^{d_{2 \cdot L+l}}, g_2\right)$$

-continued $$e\left(\prod_{l=1}^{L}\left(g_1^{Z_b^{(l)}}\right)^{d_l}, g_2^{\gamma_b}\right) = e\left(\prod_{l=1}^{L}\left(g_{v1}^{V_b^{(l)}} \cdot g_{w1}^{W_b^{(l)}} \cdot g_{y1}^{Y_b^{(l)}}\right)^{d_l}, g_2^{\beta_b \cdot \gamma_b}\right)$$

batch verification of L proofs comprising performing the following equality test:

$$\prod_{l=1}^{L} e\left(\prod_{b=1}^{\ell}(g_{v1}^{V_b^{(l)}})^{d_l}, \prod_{b=1}^{\ell}(g_{w2}^{W_b^{(l)}})\right) =$$

$$e\left(\prod_{l=1}^{L}(g_1^{H^{(l)}})^{d_l}, g_{y2}^{t(s)}\right) \cdot e\left(\prod_{l=1}^{L}\prod_{b=1}^{\ell}\left(g_{y1}^{Y_b^{(l)}}\right)^{d_l}, g_2\right)$$

This makes verification of a proof even faster due to batch verification of digests of the proof.

Identification of the entity can comprise comparison of the matching values with a predetermined threshold.

Function F can comprise comparison of the result of the scalar product between said biometric data of the entity and said reference biometric data with a predetermined threshold.

Such comparison to a threshold decides if the compared biometric data are sufficiently close to conclude successful identification of the entity to be identified.

Encoding of k binary integers $u_i$ or $u'_i$ on an input wire of an $j^{th}$ multiplication operator, $1 \leq j \leq N/k$, is equal to $$E_k^{\left(\frac{(z-1)N}{m}+(j-1)k+1\right)}(u)$$

or $$E_k^{\left(\frac{(z-1)N}{m}+(j-1)k+1\right)}(u')$$

with $1 \leq z \leq m$, and is given by the formula:

$$E_k^{((j-1)k+1)}(x) = \sum_{i=1}^{k} 2^{\varepsilon_i} \cdot x_{(j-1)k+i} = 2^{\varepsilon_1} \cdot x_{(j-1)k+1} + \ldots + 2^{\varepsilon_k} \cdot x_{(j-1)k+k}$$

with $\in_1, \ldots, \in_k$ predetermined integers.

Several integers of the biometric data can be encoded on each input wire, reducing the number of multipliers necessary for computation of the scalar product between a biometric datum of the entity and a reference biometric datum.

According to a second aspect, the invention relates to a computer program product comprising code instructions for execution of a method according to the first aspect when this program is executed by a processor.

According to a third aspect, the invention relates to a biometric identification system comprising a client device and a remote computation device characterized in that said client device and said remote computation device each comprise a processor, an interface and a memory for performing the steps of the identification method according to the first aspect.

Such computer program product and system have the same advantages as those mentioned for the method according to the first aspect.

PRESENTATION OF THE FIGURES

Other characteristics and advantages of the present invention will emerge from the following description of a preferred embodiment. This description will be given in reference to the appended drawings, in which:

FIGS. 7a and 7b illustrate an arithmetic circuit for biometric identification of an entity according to a third mode of operation of the invention;

DETAILED DESCRIPTION

Figure 1:
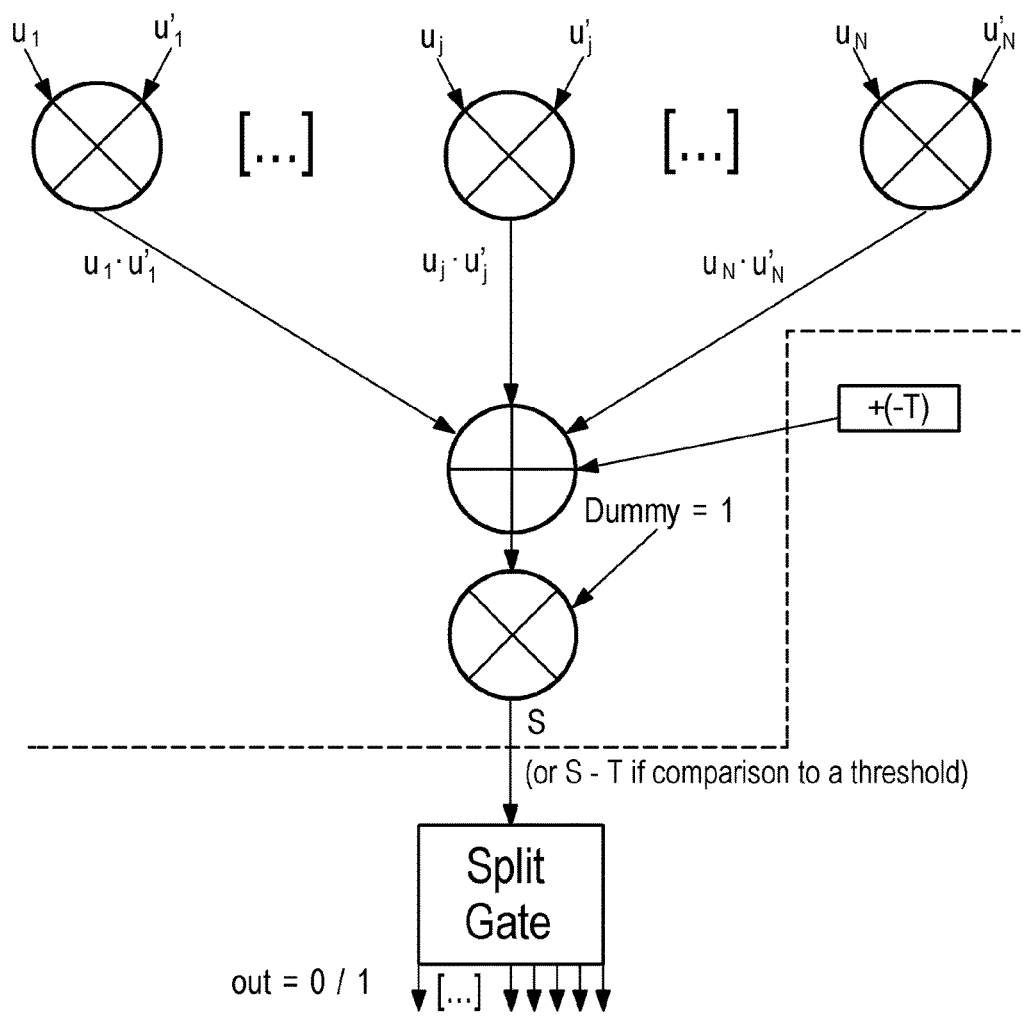
FIG. 1 illustrates an arithmetic circuit corresponding to naive implementation of a scalar product for biometric identification of an entity.
Figure 2:
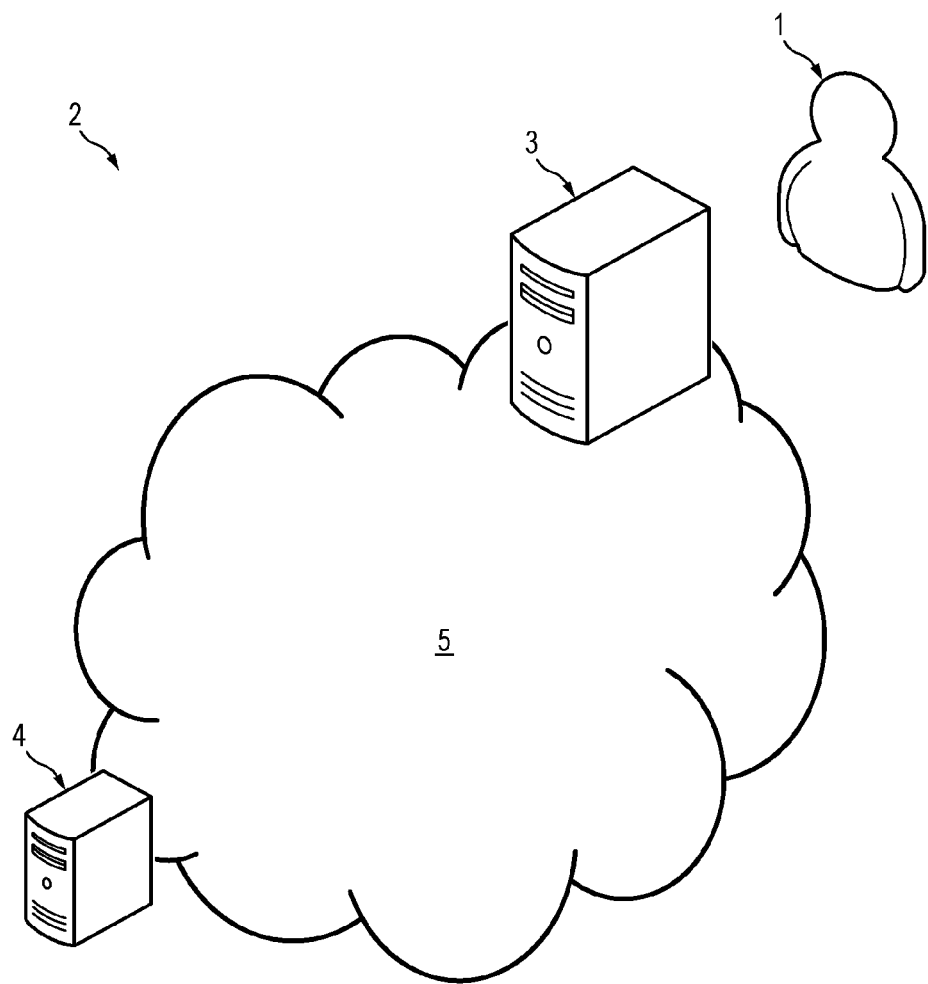
FIG. 2 illustrates an identification system according to an embodiment of the invention.

The present invention relates to implementing a biometric identification method of an entity 1 by an identification system 2 comprising a client device 3 and a remote computation device 4 capable of being connected together by a communications network 5, as represented in FIG. 2. Such an entity can be an individual or else an object having biometric data such as a biometric passport.

The client device and the remote computation device can each comprise a random access memory and internal storage means such as rewritable non-volatile memory (flash memory or EEPROM memory) and processing means comprising a processor. They can also comprise an interface for dialoguing with each other, of wired type such as an Ethernet link, or wireless such as a Wifi or Bluetooth connection.

The aim of this method carried out is to allow the device to delegate to the remote computation device the computations necessary for biometric identification of the entity to be identified, so that the computations made by the remote computation device are publicly verifiable, all this happening over a sufficiently short period to be acceptable in terms of an identification method.

For conducting such biometric identification the client device acquires at least one biometric datum of the entity to be identified u. To identify the entity, this at least one biometric datum u must be compared to one or more reference biometric data u', stored in advance.

By way of example, such biometric data can be fingerprints, DNA, voice or even iris images or venous networks. Each of these biometric data is a vector of N binary integers $u_i$ or $u'_i$ with $1 \leq i \leq N$. Each integer $u_i$ or $u'_i$ is coded on n bits. For example in the case of a face biometric datum, there can typically be N=3000 and n=8.

The client device can comprise or be connected to a device for capturing such biometric data, such as a fingerprint reader, a microphone, or an iris-imaging device. This capture device can be employed to acquire the biometric datum u acquired for the entity 1. The reference biometric data u' can be stored in the storage means of the client device or of the remote computation device.

Figure 3:
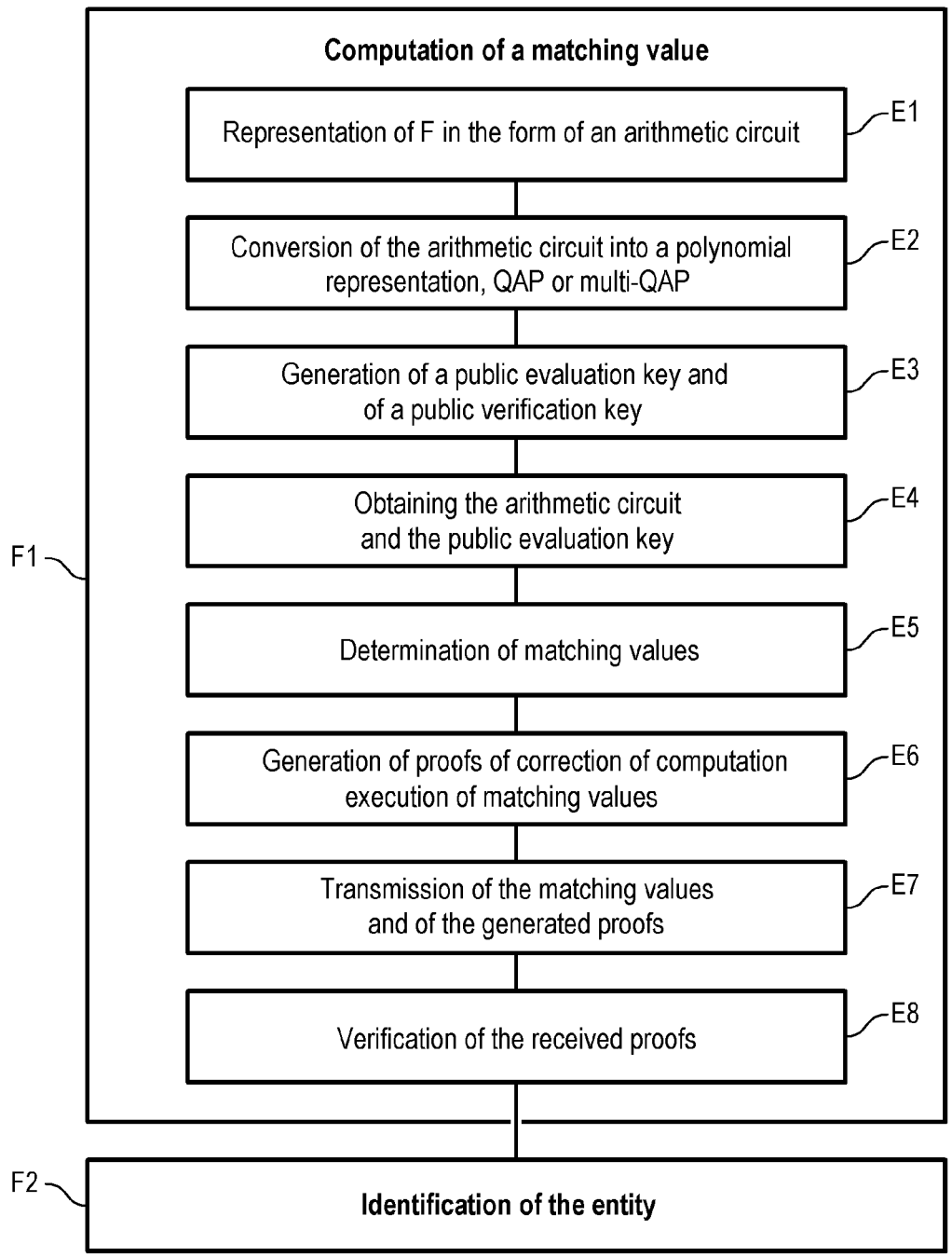
FIG. 3 is a diagram showing an implementation of an identification method according to the invention.

The identification method can comprise the steps described hereinbelow in reference to FIG. 3.

First of all at least one matching value can be computed F1 between at least one biometric datum of the entity u and at least one reference biometric datum u', by application of a function F, so-called correlation function, to said biometric data. Function F comprises a scalar product between a biometric datum of the entity and a reference biometric datum. Such a scalar product in fact computes a score $S=\Sigma_{j=1}^{N}(u_j \cdot u_j')$ which is all the higher since the data compared are similar. Such a score can be used as matching value. To determine if an attempt at identification has succeeded, the matching values can be compared to a predetermined threshold T. Alternatively, function F can comprise the comparison of the result of the scalar product between the biometric data of the entity u and the reference biometric data u', i.e. of the score S, to this predetermined threshold T. Computation of the matching value can comprise computation of the value (S−T) and the matching value coming from such computation can be a sign bit for example taking the value 1 if S−T>0, the value 0 if not.

To ensure the quality of the result obtained, computation of such a matching value F1 employs a non-interactive, publicly verifiable computation method. Such a method generally being divided into three phases:

representation of the function F to be evaluated in the form of a system constraints represented in the form of an arithmetic circuit.

transformation of this arithmetic circuit into polynomial representation called "Quadratic Arithmetic Programs" (abbreviated to QAP below).

generation of a proof of correction of the computation execution from the QAP.

The non-interactive, publicly verifiable computation method carried out more precisely first comprises a representation step E1 of said function F in the form of an arithmetic circuit. Such an arithmetic circuit comprises wires transporting values of the finite prime field Zq, with q a prime number, and connecting addition and multiplication operators. Typically the size q of the values of the circuit wires can be equal to 256 bits.

The arithmetic circuit is then converted E2 into a polynomial representation, QAP ("Quadratic Arithmetic Program") or multi-QAP. Such representations and the way to attain them from an arithmetic circuit are described in more detail in the publications cited hereinabove on the existing Pinocchio and Geppetto protocols.

Next a public evaluation key and a public verification key are generated E3 as a function of said polynomial representation. The remote computation device then obtains E4 the arithmetic circuit and the public evaluation key.

The representation steps in the form of an arithmetic circuit E1, conversion into a polynomial representation E2 and generation of keys E3 can be conducted by the client device itself. Alternatively these steps can be delegated to a trusted third party. Since such steps are independent of the value of the biometric data to be compared, they can be conducted once only, prior to comparisons of biometric data described hereinbelow, and do not need to be repeated as long as the format of the biometric data to be compared does not change.

For each biometric datum of the entity at least one matching value between said biometric datum and at least one reference biometric datum is then determined E5 by the remote computation device by evaluating the arithmetic circuit with the biometric data of the entity and the reference biometric datum as inputs.

For each determined matching value the remote computation device generates E6 a proof of correction of the computation execution of the matching value, so-called generated proof, from said polynomial representation, the public evaluation key and the result of evaluation of the arithmetic circuit. It then transmits E7 the matching values and said generated proofs to the client device.

The latter verifies E8 the received proof by means of the public verification key. The verification step of said received proofs E8 can comprise or not batch verification of pairings.

Finally the entity is identified F2 by the client device as a function of the matching values and the result of said verification of proofs.

The integers $u_i$ and $u_i'$ constituting the data of the entity and the reference data are usually encoded on a number of bits n far less than the size q of the values of wires of the circuit. By way of example the number of bits n can be equal to 8 bits and the size q can be equal to 256 bits. To limit the number of multipliers necessary for representation of the function F in the form of an arithmetic circuit, several integers u respectively $u_i'$ are encoded on each input wire of the arithmetic circuit. Representation of said function E1 comprises encoding an integer k>1 of binary integers of a vector of a biometric datum on at least one input wire of the circuit. In practice, encoding $E_k^{((j-1)k+1)}(u)$ or $E_k^{((j-1)k+1)}(u')$ of k binary integers $u_i$ or $u_i'$ on an input wire of a $j^{th}$ multiplication operator, $1 \le j \le N/k$, can be defined by the formula:

$$E_k^{((j-1)k+1)}(x) = \sum_{i=1}^{k} 2^{\varepsilon_i} \cdot x_{(j-1)k+i} = 2^{\varepsilon_1} \cdot x_{(j-1)k+1} + \ldots + 2^{\varepsilon_k} \cdot x_{(j-1)k+k}$$

with $\varepsilon_1, \ldots, \varepsilon_k$ predetermined integers.)

A multiplier having on input $E_k^{((j-1)k+1)}(u)$ and $E_k^{((j-1)k+1)}(u')$ has on its output wire the product of encodings of successive k binary integers $u_i$ or $u_i'$ coded on its input wires. This product is noted $E_{u \cdot u', k}^{((j-1)k+1)} = E_k^{((j-1)k+1)}(u) \cdot E_k^{((j-1)k+1)}(u')$. By way of example, for j=1, there is: $E_{u \cdot u', k}^{(1)} = 2^{2 \cdot \varepsilon_1} \cdot u_1 \cdot u_1' + 2^{\varepsilon_2} \cdot (u_1 \cdot u_2' + u_2 \cdot u_1') + 2^{2 \cdot \varepsilon_2} \cdot u_2 \cdot u_2' + \ldots + 2^{2 \cdot \varepsilon_k} \cdot u_k \cdot u_k'$ To further reduce the number of multipliers of the arithmetic circuit, the method as carried out also proposes splitting computation of the scalar product of the biometric datum of the entity u and of the reference biometric datum u' of lengths N into several computations of scalar products of vectors of lesser size coming from splitting of the vectors u and u'. The combination of the results of these scalar products produces the score S corresponding to the result of the scalar product of u and u'.

For this, function F comprising at least m scalar products, function F can be decomposed into at least m occurrences of sub-functions, m being a divider m of the length N of the biometric data vectors. Only the split sub-functions are represented by their own sub-circuit in the arithmetic circuit, reducing the number of multipliers of the circuit. To combine decomposition of the scalar product of u and u' into m scalar sub-products, and coding of k integers on each input wire of the circuit, it is possible to select k such that k divides m. The scalar product of u and u' can be decomposed into m scalar sub-products of vectors of length N/km. The sum of the results of these m scalar products produces an encoded score S̃ defined by the following formula:

$$\tilde{S} = \sum_{j=1}^{N/k} E_{u \cdot u', k}^{((j-1)k+1)}$$

$$= \sum_{j=1}^{N/k} \begin{pmatrix} 2^{2 \cdot \varepsilon_1} \cdot (u_{(j-1)k+1} \cdot u'_{(j-1)k+1}) + \\ 2^{\varepsilon_2} \cdot (\ldots) + \ldots + 2^{2 \cdot \varepsilon_k} \cdot (u_{jk} \cdot u'_{jk}) \end{pmatrix}$$

and of the following form if the expression hereinabove is deployed and if the terms are gathered by power of 2: $\tilde{S} = 2^{2 \cdot \in_1} \cdot a_1 + 2^{2 \cdot \in_2} \cdot a_2' + 2^{2 \cdot \in_2} \cdot a_2 + 2^{2 \cdot \in_3} \cdot a_3' + \ldots + 2^{2 \cdot \in_k} \cdot a_k$ with $a_i$ the terms at $2^{2 \cdot \in_i}$ gathering the products of integers $u_i$ and $u'_i$ of the same indices useful for computing the scalar product and u and u', and with $a_i'$ the terms at $2^{\in_2}, \ldots, 2^{\in_k}$ gathering the remaining products, cross products of integers $u_i$ and $u'_j$ of different indices not useful for computation of the scalar product of u and u'.

To extract the score S from its encoded version $\tilde{S}$, it is possible to extract the k sub-terms corresponding to the coefficients $2^{2 \cdot \in_1}, \ldots, 2^{2 \cdot \in_k}$ (i.e., the elements $a_1, a_2, \ldots, a_k$), then add them.

The paragraphs hereinbelow present the specific features of the method for different ranges of value of the divider m. m can be determined by making a compromise between the computational powers of the client device and the remote computation device as well especially as memories.

Figure 4A:
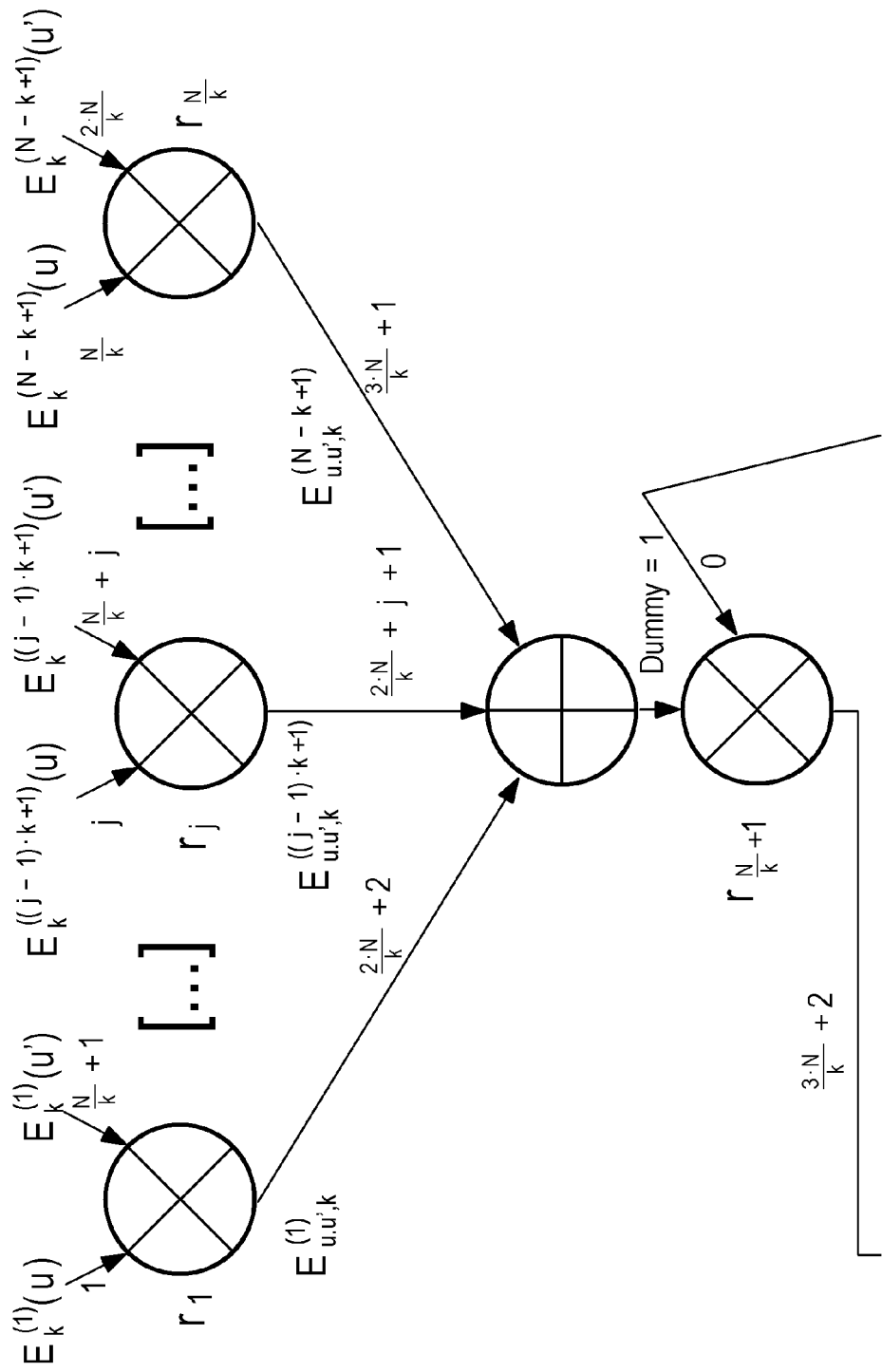
FIGS. 4a and 4b illustrate an arithmetic circuit for biometric identification of an entity according to a first mode of operation of the invention.
Figure 4B:
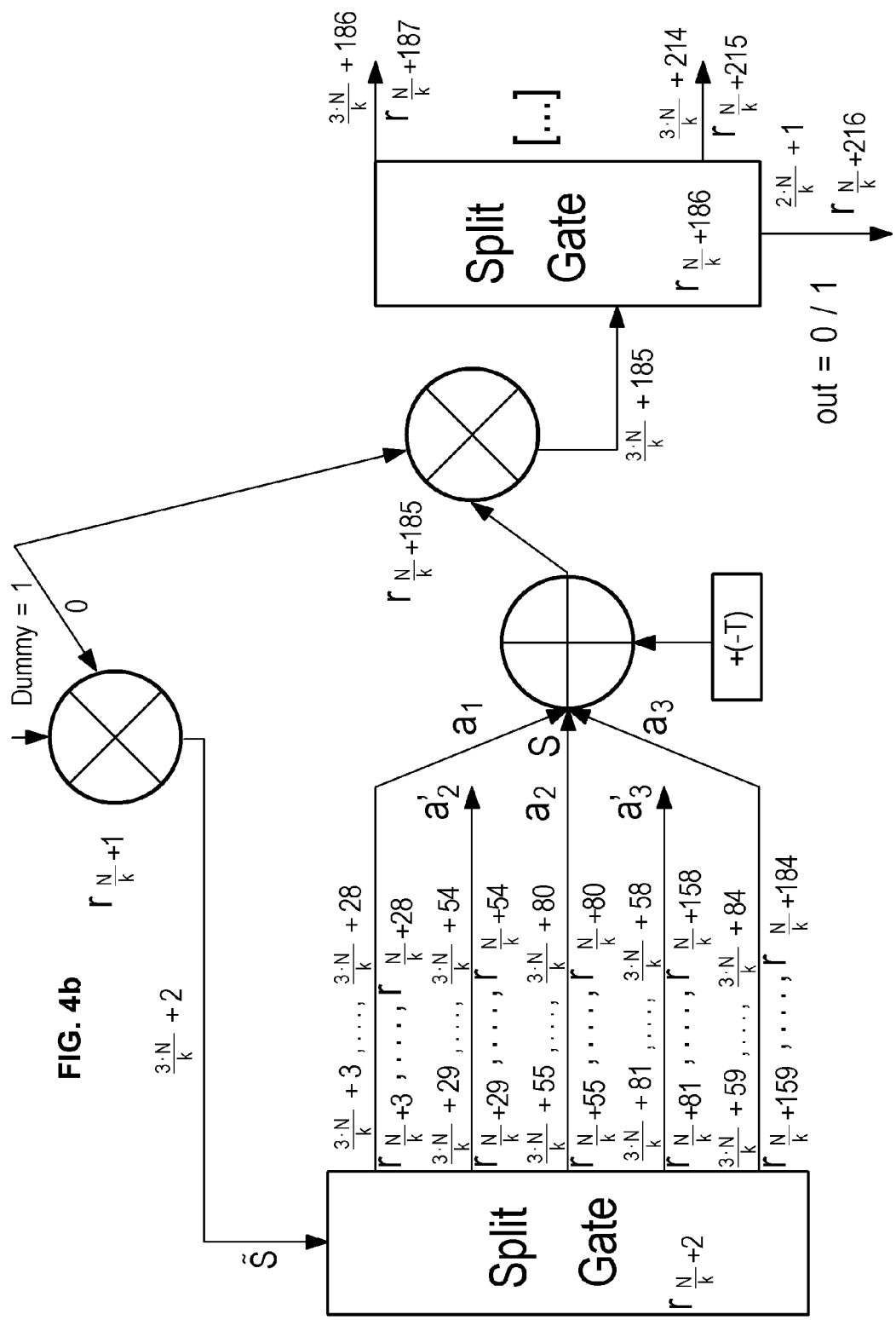

In a first mode of operation in which the divider m is equal to 1, function F can be put in the form of the circuit represented in FIGS. 4a and 4b. Such a circuit comprises N/k input multipliers each taking on input $E_k^{((j-1)k+1)}(u)$ and $E_k^{((j-1)k+1)}(u')$ with $1 \le j \le N/k$. In FIGS. 4a and 4b these multipliers are noted $r_j$ and the input wires are numbered from 1 to 2N/k. The N/k output wires of the multipliers carry the values $E_{u \cdot u', k}^{((j-1)k+i)}$ whereof the sum is equal to the encoded score $\tilde{S}$ described hereinabove. The circuit comprises an additional output multiplier, numbered $r_{N/k+1}$, necessary for conversion of the circuit in the form of QAP. This multiplier multiplies the output of the scalar product by 1 so as not to modify the encoded score $\tilde{S}$. Finally, a split gate is employed to extract the coefficients $a_i$ with $1 \le i \le k$ corresponding to the terms of the scalar product $u \cdot u'$. The summation of these terms first split from the encoded score then reconstituted by multiplication by powers of two and added produces the score S. FIGS. 4a and 4b correspond to an execution in which the score is compared to the predetermined threshold T. The value (S−T) is computed and provided on input with a second split gate to extract the sign bit indicating the result of the comparison. More precisely, hereinbelow split gate means an arithmetic gate which splits an integer bit by bit. Given an integer $a \in \mathbb{Z}_q$, as is known to keep on $\tau$ bits, the split gate contains an input wire (containing the integer a) and $\tau$ output wires. In terms of elementary arithmetic constraints, its definition is given for example in the cited article Pinocchio, paragraph 3.2. It is recalled here by way of indication. It is clear that $c_0$ is the input wire and $c_1, \ldots, c_\tau$ the output wires. The arithmetic circuit of the gate so-called "split gate" is defined as follows:

concatenation of the bits on output is equal to the input $$\sum_{i=1}^{\tau} 2^{j-1} \cdot c_j = c_0$$

each output wire contains a Boolean value (0 or 1):

$\forall i \in \{1, \ldots, \tau\}: c_j \cdot (1 - c_j) = 0$

When a "split gate" gate is used within a circuit, the integer $\tau$ is determined as an achieved upper limit given the size of the circuit inputs and all the arithmetic gates located between the inputs and the split gate.

Figure 5A:
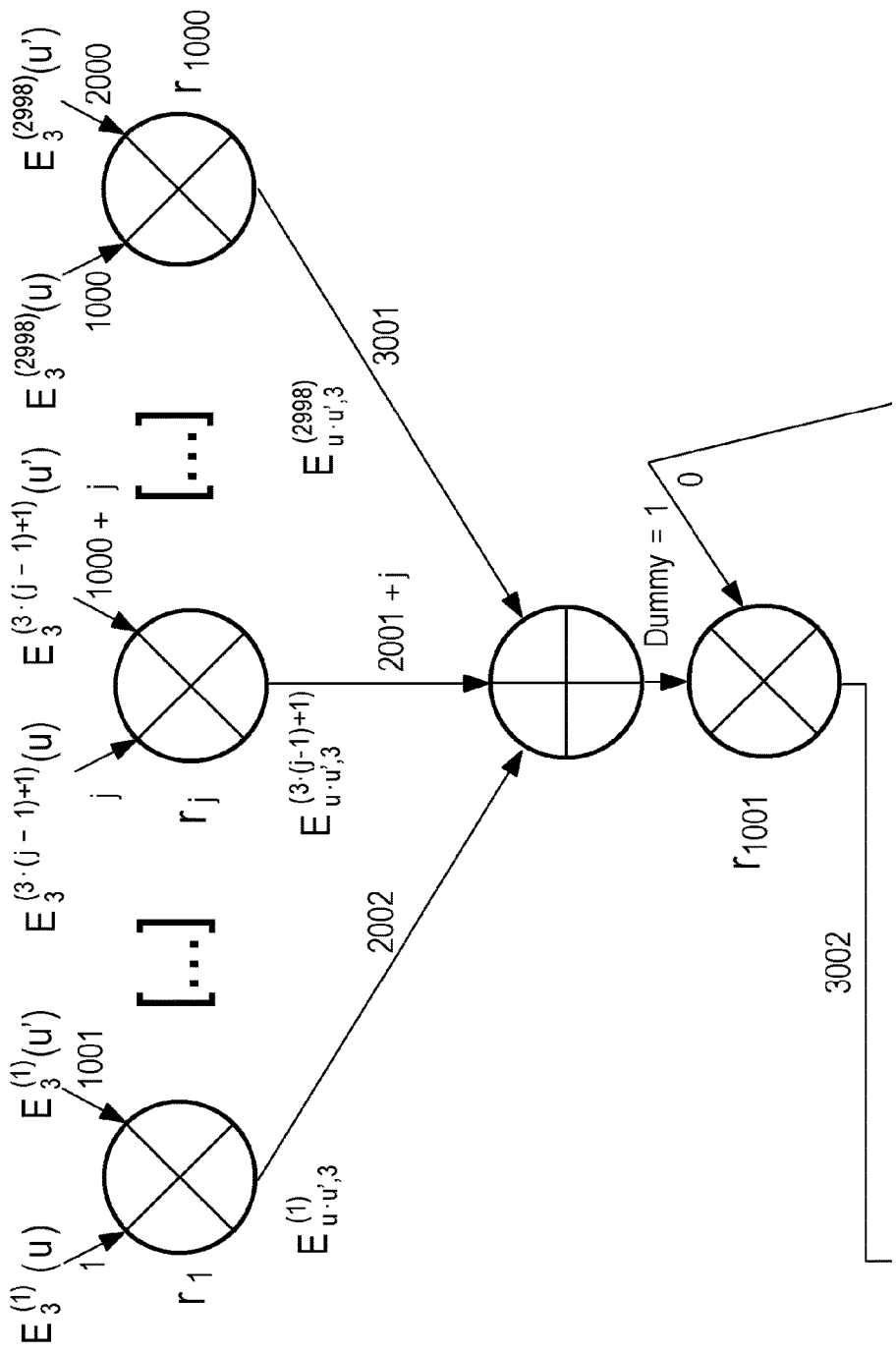
FIGS. 5a and 5b illustrate an example implementation of the circuit of FIG. 4 for N=3000, n=8, q=256, k=3.
Figure 5B:
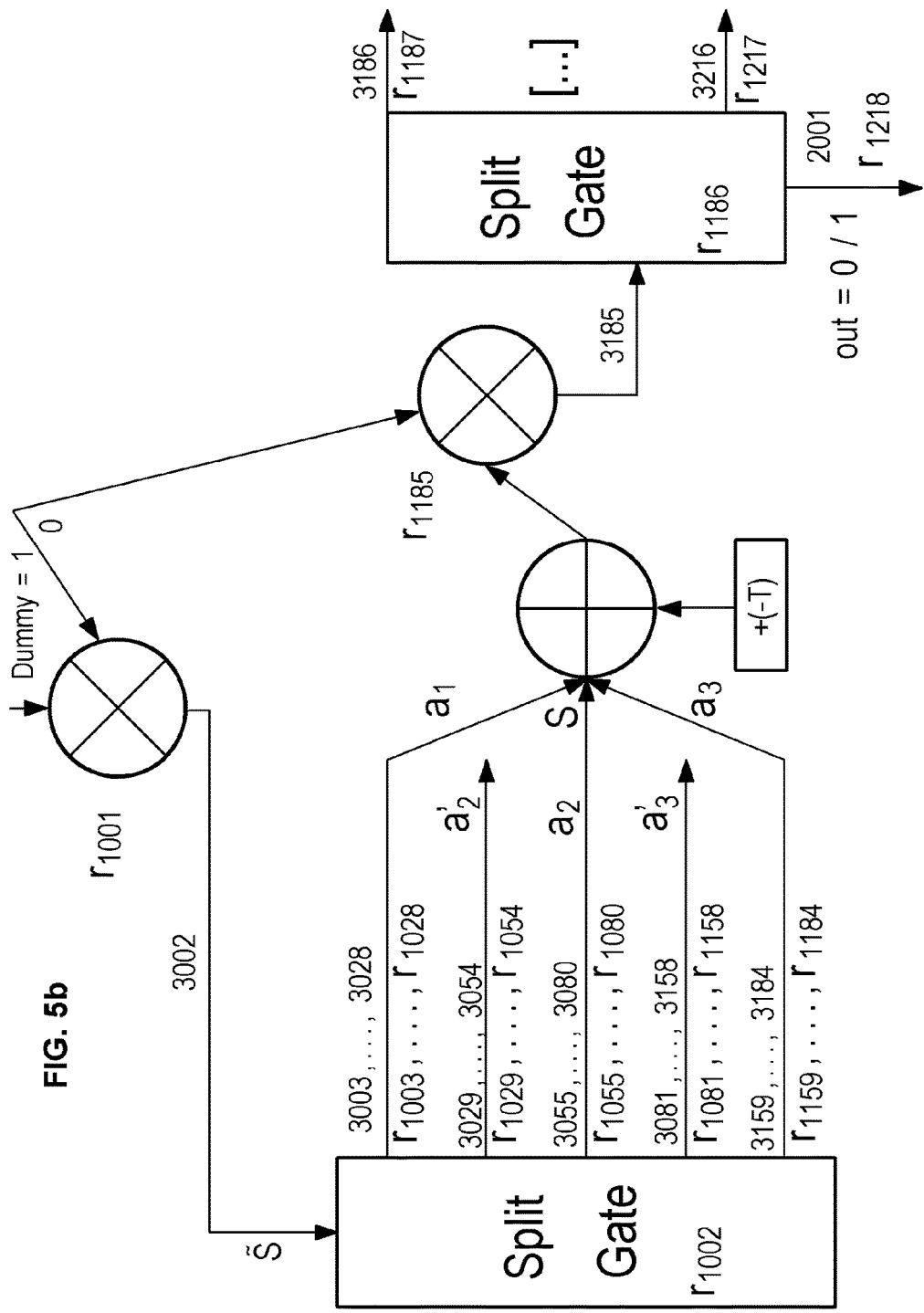

An example of implementation is represented in FIGS. 5a and 5b for N=3000, n=8, q=256, k=3. In such an mode of operation, the following values can be used for the parameters $\varepsilon_i: \varepsilon_1 = 0$, $\varepsilon_2 = 26$, $\varepsilon_3 = 78$.

In a second mode of operation in which the divider m is equal to 2 or 3, function F can be decomposed into a function F1 computing a scalar sub-product between two vectors of size N/km, to be used m times, and a function F2 computing the sum of m values, corresponding to a coded score, and performing extraction of the corresponding score equal to the preferred scalar product.

Figure 6A:
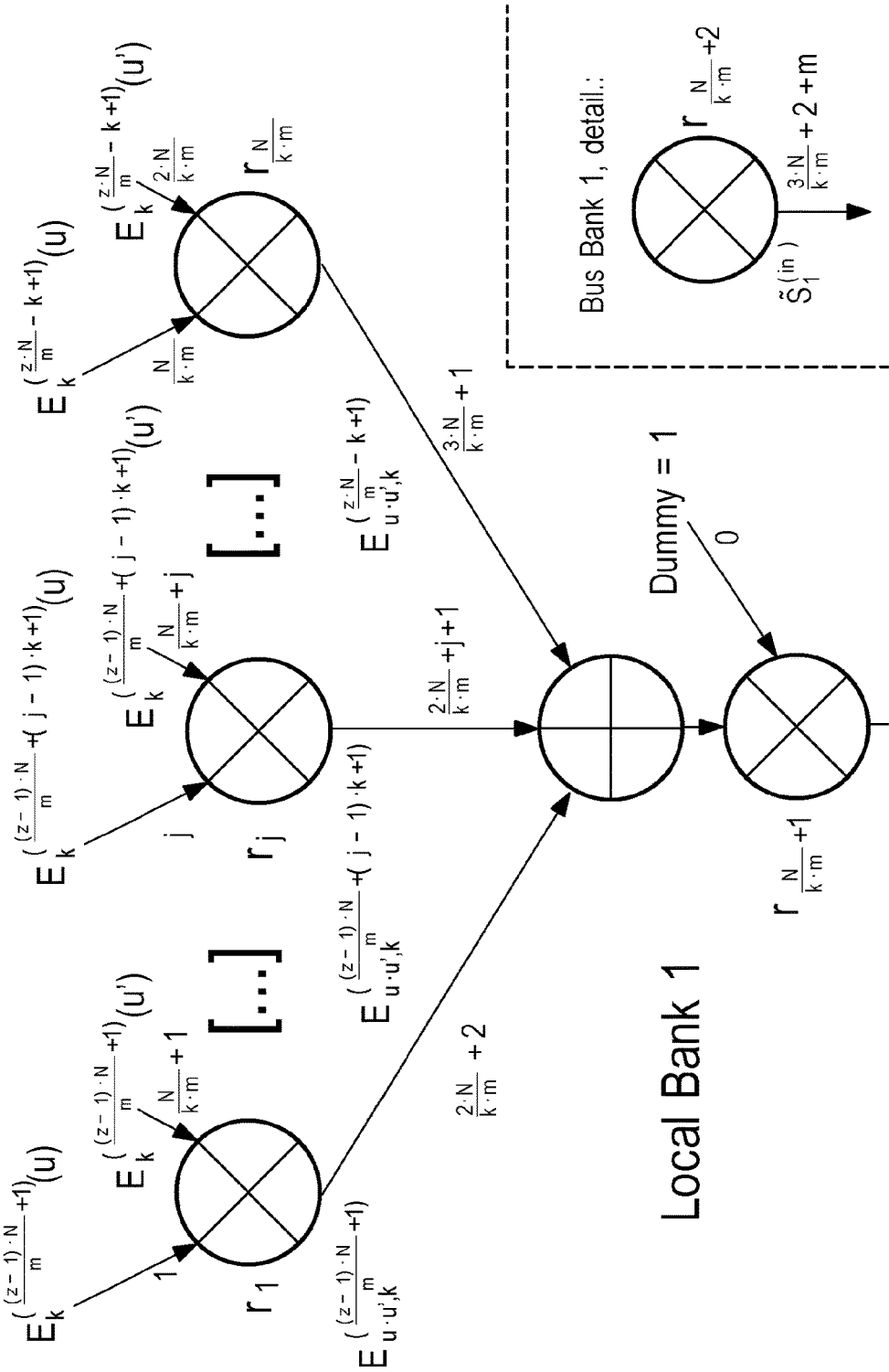
FIGS. 6a to 6c illustrate a arithmetic circuit for biometric identification of an entity according to a second mode of operation of the invention.
Figure 6B:
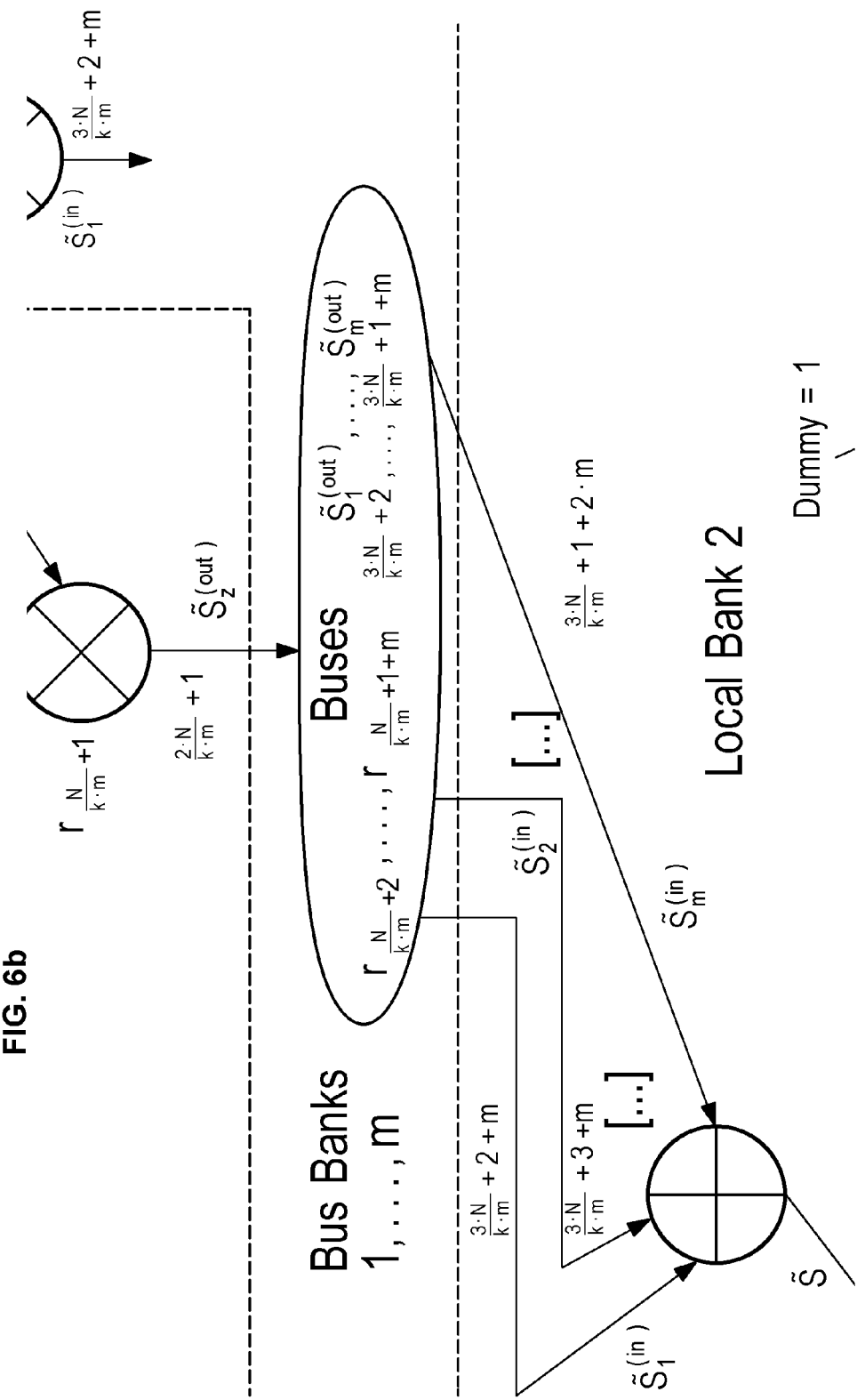
Figure 6C:
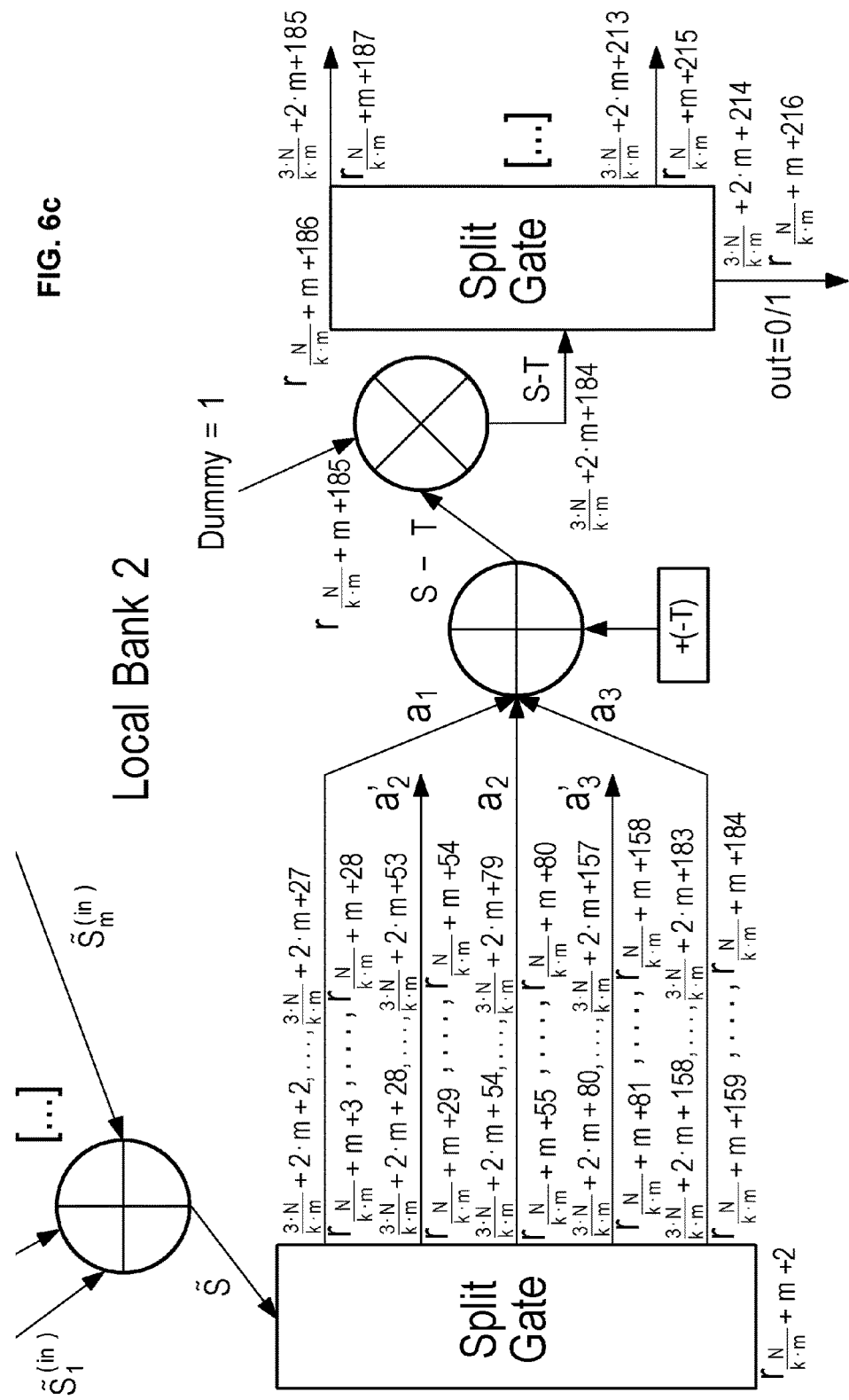

As represented in FIGS. 6a to 6c, the corresponding circuit comprises at least N/km multiplication operators connected to the input wires of the circuit, a storage memory, and at least one addition operator, and evaluation of the circuit iteratively comprises computation of each of the m scalar products by means of said N/km multiplication operators, storage of the m results of computations of said scalar products in said storage memory and summation of said results by means of said addition operator.

With $F_1$ and $F_2$ defined as such, evaluation of function F corresponds to m applications of function $F_1$ followed by application of function $F_2$. The circuit represented in FIGS. 6a to 6c comprises N/km input multipliers each taking on input, during the iteration z of the function F1, $$E_k^{(\frac{(z-1)N}{m}+(j-1)k+1)}(u)$$

and $$E_k^{(\frac{(z-1)N}{m}+(j-1)k+1)}(u')$$

with $1 \le j \le N/km$. In FIGS. 6a to 6c these multipliers are noted $r_j$ and the input wires are numbered from 1 to 2 N/km.

The m applications of function $F_1$ compute the coded sub-scores $\tilde{S}_z$, for $z \in \{1, \ldots, m\}$:

$$\tilde{S}_z = \sum_{j=1}^{N/k \cdot m} E_{u \cdot u', k}^{((z-1) \cdot (N/m) + (j-1)k + 1)}$$

By way of example, for z=1, there is:

$$\tilde{S}_1 = \sum_{j=1}^{N/k \cdot m} E_{u \cdot u', k}^{((j-1)k+1)}$$

$$= \sum_{j=1}^{N/k \cdot m} \begin{pmatrix} 2^{2 \cdot \varepsilon_1} \cdot (u_{(j-1)k+1} \cdot u'_{(j-1)k+1}) + \\ 2^{\varepsilon_2} \cdot (\ldots) + \ldots + 2^{2 \cdot \varepsilon_k} \cdot (u_{jk} \cdot u'_{jk}) \end{pmatrix}$$

During the iteration z the N/km output wires of the multipliers thus carry the values $$E_{u \cdot u', k}^{(\frac{(z-1)N}{m} + (j-1)k + 1)}$$

whereof the sum is equal to the encoded score $\tilde{S}_z$ described hereinabove. The circuit comprises an additional output multiplier, numbered $r_{N/km+1}$, necessary for conversion of the circuit into the form of QAP. The m coded sub-scores $\tilde{S}_z$ noted $\tilde{S}_z^{(out)}$ in FIGS. 6a to 6c are stored in the storage memory corresponding to the m bus ("Bus Bank") of the verifiable computation method. Evaluation of function F2, with on input the m values coming from the buses, noted $\tilde{S}_z^{(in)}$ in FIGS. 6a to 6c, produces the coded score S described hereinabove.

As in the case of the circuit in FIGS. 4a and 4b, a first split gate recovers the terms $a_i$ with $1 \leq i \leq k$ corresponding to the terms of the scalar product $u \cdot u'$. The summation of these terms produces the score S which is then compared to the predetermined threshold T.

According to a variant not represented, function F1 can comprise decoding of the coded sub-score $\tilde{S}_z$ obtained during its evaluation into a sub-score $S_z$. Such decoding can be done similarly to the decoding of the coded score $\tilde{S}$ presented hereinabove. Function F2 comprises only the summation of the sub-scores $S_z$ to obtain the score S corresponding to the scalar product $u \cdot u'$, according to the formula:

$$\sum_{z=1}^{m} S_z = \sum_{z=1}^{m} \left( \sum_{j=1}^{N/km} \left( \sum_{i=1}^{k} u_{(z-1)\cdot(N/m)+(j-1)\cdot k+i} \cdot u'_{(z-1)\cdot(N/m)+(j-1)\cdot k+i} \right) \right)$$
$$= \sum_{z=1}^{N} u_z \cdot u'_z$$
$$= \langle u, u' \rangle$$
$$= S$$

In a third mode of operation in which the divider m is greater than or equal to 4, it is possible to decompose function F into a function $F_1$ and a function $F_2$, alternatively use and m times the total, which each take on input two vectors of size N/km and a sub-score, and on output return an updated sub-score defined as the sum of the sub-score given on input with the result of the scalar product of the vectors provided on input; and a function $F_3$ which decodes a coded score $\tilde{S}$ into a score S.

Figure 7A:
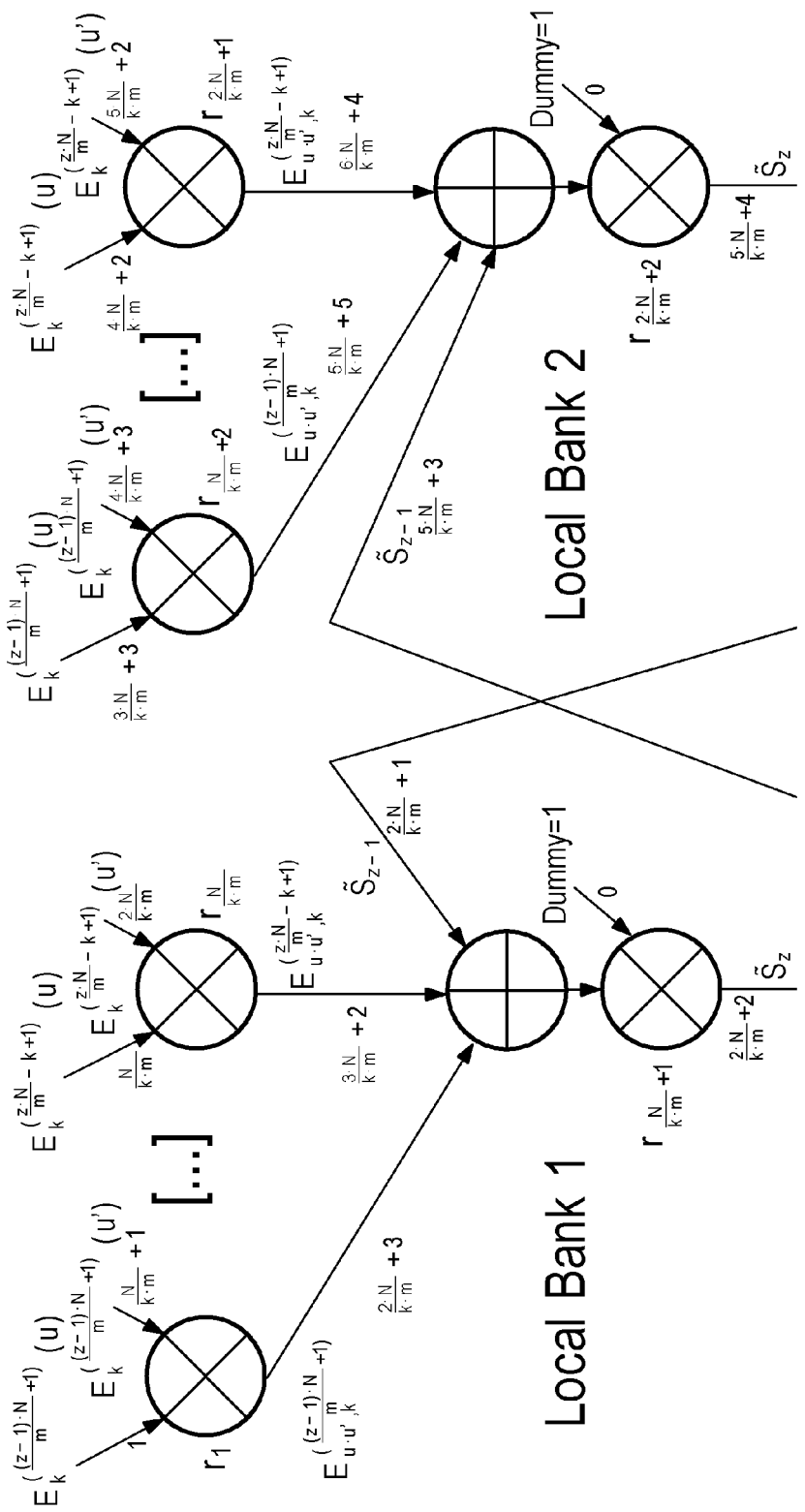

As represented in FIGS. 7a and 7b, the circuit comprises at least one first computation sub-circuit of scalar product comprising N/km first multiplication operators connected to the input wires of the circuit, for evaluation of function F1 for z odd, and a first storage memory, and a second computation sub-circuit of scalar product comprising N/km second multiplication operators connected to the input wires of the circuit, for evaluation of function F2 for z even, and a second storage memory, each of said sub-circuit being also connected to an output of the storage memory of the other sub-circuit, and evaluation of the circuit iteratively comprises computation of each of the m scalar products by using alternatively the first or the second sub-circuit to compute the sum of the scalar product of the values of the input wires of this sub-circuit and of the value stored in the storage memory of the other sub-circuit.

With $F_1$, $F_2$ and $F_3$ defined as such, evaluation of the function F then corresponds to m applications alternatively of function $F_1$ and function $F_2$ followed by application of function $F_3$.

The circuit represented in FIGS. 7a and 7b comprises two sets of N/km input multipliers. During the iteration z of the function F1 or F2, the N/km multipliers of the relevant sub-circuit each take on input, $$E_k^{\frac{(z-1)N}{m}+(j-1)k+1}(u)$$

and $$E_k^{\frac{(z-1)N}{m}+(j-1)k+1}(u')$$

with $1 \leq j \leq N/km$. In FIGS. 7a and 7b these multipliers are noted $r_j$ with respectively $1 \leq j \leq N/km$ and $N/km+2 \leq j \leq 2N/km+1$. The input wires are numbered respectively from 1 to 2N/km and from 3N/km+3 to 5N/km+2.

The m applications of functions $F_1$ and $F_2$ compute the coded sub-scores $\tilde{S}_z$, for $z \in \{1, \ldots, m\}$:

$$\tilde{S}_z = \sum_{\zeta=1}^{z} \sum_{j=1}^{N/k \cdot m} E_{u \cdot u', k}^{((\zeta-1)(N/m)+(j-1)k+1)}$$

The N/km output wires of the multipliers of a sub-circuit during the iteration z carry the values $$E_{u \cdot u', k}^{\frac{(z-1)N}{m}+(j-1)k+1}$$

whereof the sum, added to the coded sub-score of the preceding iteration $\tilde{S}_{z-1}$, is equal to the encoded score $\tilde{S}_z$ described hereinabove. The sub-score $\tilde{S}_0$ can be also initialized at 0 during the first iteration. The coded score $\tilde{S}$ is constructed iteratively, each iteration adding to the sub-score coming from the preceding iteration the result of the current scalar sub-product $\Sigma_{j=1}^{N/k \cdot m} E_{u \cdot u', k}^{((z-1)(N/m)+(j-1) \cdot k+1)}$.

The circuit comprises an additional output multiplier for each sub-circuit, numbered $r_{N/km+1}$, $r_{2N/km+2}$ necessary for conversion of the circuit in the form of QAP. On completion of its evaluation each sub-circuit stores the coded sub-scores $\tilde{S}_z$ computed in the storage memory corresponding to its bus (Bus Bank) $r_{2N/km+3}$, $r_{2N/km+219}$ in terms of the verifiable computation method.

On completion of m iterations of functions F1 and F2, the coded score g is thus stored in one of the two storage memories. In the example of FIGS. 7a and 7b, it is supposed that m is odd. The coded score $\tilde{S}$ is stored in the first storage memory. During evaluation of the function F3, with the coded score $\tilde{S}$ on input a first split gate recovers the terms $a_i$ with $1 \leq i \leq k$ corresponding to the terms of the scalar product $u \cdot u'$. The summation of these terms produces the score S which is then compared to the predetermined threshold T.

Within the scope of the method described hereinabove the operations to be carried out for generation of the evaluation and verification public keys, and for generation and verification of computation proof can be derived from existing verifiable computation protocols such as Pinocchio, when m=1, and Geppetto, when m>1. The paragraphs hereinbelow describe these operations in more detail as a function of the value of the divider m.

It is to be understood that the embodiment to be described is a particularly advantageous embodiment which is not limiting. The skilled person can use other ways to perform generation of the evaluation and verification public keys, generation and verification of computation proof, and derive said operations from other verifiable existing computation protocols.

Case m=1: In the first mode of operation where m=1, an asymmetric bilinear environment (q, $G_1$, $G_2$, $G_T$, $g_1$, $g_2$, e) is defined with q a prime number, $G_1$, $G_2$ and $G_T$ three groups of order q, $g_1$ a generator of $G_1$, $g_2$ a generator of $G_2$, and e a non-degenerate bilinear pairing e: $G_1 \times G_2 \to G_T$.

The arithmetic circuit can be represented in the form of a polynomial representation of the circuit Q=(t,V,W,Y) of size ρ and degree δ, with V={vi}, W={wi}, Y={yi}, 0≤i≤ρ.

The following are noted hereinbelow:

$I_{io}$={1, . . . , θ} the set of indices corresponding to the input/output wires of the circuit, $I_{mid}$={θ+1, . . . , ρ} the set of indices of the intermediate wires of the circuit not being input wires of the circuit.

During generation step E3 of a public evaluation key and a public verification key, random variables $r_v$, $r_w$, s, $\alpha_v$, $\alpha_w$, $\alpha_y$, β, γ are first generated in $\mathbb{Z}_q$.

Then the following coefficients are defined: $r_y = r_v \cdot r_w$, $g_{v1} = g_1^{r_v}$, $g_{w1} = g_1^{r_w}$, $g_{w2} = g_2^{r_w}$, $g_{y1} = g_1^{r_y}$ and $g_{y2} = g_2^{r_y}$.

The public evaluation key $EK_F$ is then generated as equal to $(EK_{F1}, EK_{F2})$ where $$EK_{F1} = \begin{pmatrix} \{g_{v1}^{v_i(s)}\}_{i \in I_{mid}}, \{g_{w1}^{w_i(s)}\}_{i \in I_{mid}}, \{g_{y1}^{y_i(s)}\}_{i \in I_{mid}}, \\ \{g_{v1}^{\alpha_v \cdot v_i(s)}\}_{i \in I_{mid}}, \{g_{w1}^{\alpha_w \cdot w_i(s)}\}_{i \in I_{mid}}, \{g_{y1}^{\alpha_y \cdot y_i(s)}\}_{i \in I_{mid}}, \\ \{g_1^{s^i}\}_{i \in [1,\delta]}, \{g_{v1}^{\beta \cdot v_i(s)} \cdot g_{w1}^{\beta \cdot w_i(s)} \cdot g_{y1}^{\beta \cdot y_i(s)}\}_{i \in I_{mid}} \end{pmatrix}$$

$$EK_{F2} = \left( \{g_{w2}^{w_i(s)}\}_{i \in I_{mid}} \right)$$

The public verification key $VK_F$ is also generated as equal to $(VK_{F1}, VK_{F2})$ where:

$VK_{F1} = (g_1, \{g_{v1}^{v_i(s)}\}_{i \in [1,\theta]}, \{g_{y1}^{y_i(s)}\}_{i \in [1,\theta]})$ $VK_{F2} = (g_2, g_2^{\alpha_v}, g_2^{\alpha_w}, g_2^{\alpha_y}, g_2^{\beta \cdot \gamma}, g_{y2}^{t(s)}, \{g_{w2}^{w_i(s)}\}_{i \in [1,\theta]})$.

The remote computation device then obtains E4 the arithmetic circuit and the public evaluation key.

For each biometric datum of the entity, at least one matching value between the biometric datum of the entity and at least one reference biometric datum can then be determined E5 by the remote computation device by evaluating the arithmetic circuit received from the biometric data of the entity and the reference biometric data. The set of values of the circuit $\{c_i\}_{i \in [1,\rho]}$ can then be obtained.

Generation E6 by the remote computation device, for each determined matching value, of a proof of correction of the computation execution of the matching value, so-called generated proof $\pi = (\pi_1, \pi_2)$ can then comprise:

determination of a polynomial h(x) such that p(x)=h(x)·t(x) with $p(x) = (v_0(x) + \Sigma_{i=1}^{\rho} c_i \cdot v_i(x)) \cdot (w_0(x) + \Sigma_{i=1}^{\rho} c_i \cdot w_i(x)) - (x) + \Sigma_{i=1}^{\rho} c_i \cdot y_i(x))$, computation of:

$$\pi_1 = \begin{pmatrix} g_{v1}^{v_{mid}(s)}, g_{w1}^{w_{mid}(s)}, g_{y1}^{y_{mid}(s)}, g_1^{h(s)}, \\ g_{v1}^{\alpha_v \cdot v_{mid}(s)}, g_{w1}^{\alpha_w \cdot w_{mid}(s)}, g_{y1}^{\alpha_y \cdot y_{mid}(s)}, \\ g_{v1}^{\beta \cdot v_{mid}(s)} \cdot g_{w1}^{\beta \cdot w_{mid}(s)} \cdot g_{y1}^{\beta \cdot y_{mid}(s)}, \end{pmatrix}$$

and $\pi_2 = (g_{w2}^{w_{mid}(s)})$ where: $v_{mid}(x) = \Sigma_{i \in I_{mid}} c_i \cdot v_i(x)$, $w_{mid}(x) = \Sigma_{i \in I_{mid}} c_i \cdot w_i(x)$ and $y_{mid}(x) = \Sigma_{i \in I_{mid}} c_i \cdot y_i(x)$.

The remote computation device then transmits E7 the matching values and said generated proofs to the client device.

The proofs received by the client device are of the form $(\pi_{r1}, \pi_{r2})$ with: $\pi_{r1}$ in the form of: $(g_{v1}^{V_{mid}}, g_{w1}^{W_{mid}}, g_{y1}^{Y_{mid}}, g_1^{H}, g_{v1}^{V'_{mid}}, g_{w1}^{W'_{mid}}, g_{y1}^{Y'_{mid}}, g_1^{Z})$ and $\pi_{r2}$ in the form $g_{w2}^{W_{mid}}$.

The client device then verifies E8 each received proof $(\pi_{r1}, \pi_{r2})$ by performing the following equality tests:

$e(g_{v1}^{v_{io}(s)} \cdot g_{v1}^{v_{io}(s)} \cdot g_{v1}^{V_{mid}}, g_{w2}^{w_0(s)} \cdot g_{w2}^{w_{io}(s)} \cdot g_{w2}^{W_{mid}}) = e(g_1^{H}, g_{y2}^{t(s)}) \cdot e(g_{y1}^{y_0(s)} \cdot g_{y1}^{y_{io}(s)} \cdot g_{y1}^{Y_{mid}}, g_2)$, $e((g_{v1}^{V_{mid}})^{d_1} \cdot (g_{w1}^{W_{mid}})^{d_2} \cdot (g_{y1}^{Y_{mid}})^{d_3}, g_2) = e((g_{v1}^{V'_{mid}})^{d_1}, g_2^{\alpha_v}) \cdot e((g_{w1}^{W'_{mid}})^{d_2}, g_2^{\alpha_w}) \cdot e((g_{y1}^{Y'_{mid}})^{d_3}, g_2^{\alpha_y})$, $e((g_1^{Z}, g_2^{\gamma}) = e(g_{v1}^{V_{mid}} \cdot g_{w1}^{W_{mid}} \cdot g_{y1}^{Y_{mid}}, g_2^{\beta \cdot \gamma})$ where $g_{v1}^{v_{io}(s)} = \Pi_{i=1}^{\theta} (g_{v1}^{v_i(s)})^{c_i}$, $g_{w1}^{w_{io}(s)} = \Pi_{i=1}^{\theta} (g_{w1}^{w_i(s)})^{c_i}$, and $g_{y1}^{y_{io}(s)} = \Pi_{i=1}^{\theta} (g_{y1}^{y_i(s)})^{c_i}$ and $(d_1, d_2, d_3)$ elements of $\mathbb{Z}_q$ on λ bits with λ a security parameter. In this mode of operation the verification step of said received proofs therefore comprises batch verification of pairings.

Case m>1:

Bank B is called a sub-set of indices [1, ρ] (in other words a sub-set of the circuit wires) and an instance of a bank B is a set of values for these indices (for example noted $\{c_j\}_{j \in B}$).

The function F is divided into ω sub-functions $F_1, \ldots, F_\omega$. For example in the case of FIGS. 6 and 7 selection can be made respectively ω=2 and ω=3 as described hereinabove. $\sigma = ((f_l, (T_{l1}, \ldots, T_{ll})))_{l \in [1,L]}$ is defined as a scheduling of length L with $f_l \in \{1, \ldots, \omega\}$ the index of the function to be computed.

By way of example, in the case m=2 or m=3 described hereinabove in reference to FIGS. 6a to 6c, L=m+1 and the function F is split into two functions $F_1$, $F_2$.

The banks used are: $(B_{io}, B_{L_1}, B_{L_2}, B_{B_1}, \ldots, B_{B_m})$ where:

$B_{io}$: banks of input/output type. Number of instances: m+1

$B_{L_1}$: bank of local type for F1. Number of instances: m $B_{L_2}$: bank of local type for F2. Number of instances: 1

$B_{B_1}, \ldots, B_{B_m}$: banks of bus type. An instance of each.

The scheduling of proofs, of length m+1, is:

$\sigma = ((1,(1,1,0,1,0, \ldots 0)), \ldots, (1,(m,m,0, \ldots, 1)), (2, (m+1,0,1, \ldots, 1)))$ In other words, the scheduling of proofs is:

For l∈{1, . . . , m}: digest of $B_{L_1}^{(l)}$, pledging of $B_{B_l}$, proof with $B_{L_1}^{(l)}$, inputs $B_{io}^{(l)}$, and bus $B_{B_l}$.

For l=m+1: digest of $B_{L_2}$, proof with $B_{L_2}$, inputs $B_{io}^{(l)}$, and all buses $B_{B_1}, \ldots, B_{B_m}$.

By way of example, in the case m≥4 described hereinabove in reference to FIGS. 7a and 7b, the function F is split into three functions $F_1$, $F_2$, $F_3$. The banks used are: $(B_{io}, B_{L1}, B_{L2}, B_{L2}, B_{B1}, B_{B2})$ where:

$B_{io}$: banks of input/output type. Number of instances: m+1

$B_{L_1}$: bank of local type for $F_1$. Number of instances: ⌈m/2⌉

$B_{L_2}$: bank of local type for $F_2$. Number of instances: ⌈m/2⌉

$B_{L_3}$: bank of local type for $F_3$. Number of instances: 1

$B_{B_1}, B_{B_2}$: banks of bus type. ⌈m/2⌉ instances of the first ⌈m/2⌉ instances of the second.

The scheduling of proofs, of length m+1, is:

$\sigma = (\sigma_1, \sigma_2, \ldots \sigma_m, \sigma_{m+1})$ where:

For l ∈{1, . . . , m}:

If l odd: digest of $B_{L_1}^{(\lceil l/2 \rceil)}$, pledging of $B_{B_1}$, proof with $B_{L_1}^{(\lceil l/2 \rceil)}$, inputs $B_{io}^{(l)}$, and bus $B_{B_1}$.

$\sigma_l = (1, (l, \lceil l/2 \rceil, 0, 0, \lceil l/2 \rceil, \lceil l/2 \rceil - 1))$ If l even: digest of $B_{L_2}^{(\lceil l/2\rceil)}$, pledging of $B_{B_2}$, proof with $B_{L_2}^{(\lceil l/2\rceil)}$, inputs $B_{io}^{(l)}$, and bus $B_{B_2}$ ...

$$\sigma_l = (2, (l, 0, \lceil l/2\rceil, 0, \lceil l/2\rceil - 1, \lceil l/2\rceil))$$

For l=m+1: digest of $B_{L_3}$, proof with $B_{L_3}$, inputs $B_{io}^{(l)}$, and the bus bank $B_{B_1}$ (if m is odd) or $B_{B_2}$ (if not).

$$\sigma_l = (3, (m+1, 0, 0, 1, \lceil l-\frac{1}{2}\rceil, 0)) \text{ or } \sigma_l = (3, +1, 0, 0, 1, 0, \lceil l-\frac{1}{2}\rceil)).$$

For a number x the notation $\lceil x/2 \rceil$ (respectively $\lfloor x/2 \rfloor$) designates the natural integer greater than or equal (respectively less then or equal) to the rational value x/2. For more information on the use of banks and such scheduling, the paragraphs hereinbelow can be viewed in the light of the publication referenced hereinabove describing the Geppetto protocol from which the protocol presented hereinbelow is derived.

In these second and third modes of operation, an asymmetric bilinear environment (q, $G_1$, $G_2$, $G_T$, $g_1$, $g_2$, e) is defined with q a prime number, $G_1$, $G_2$ and $G_T$ three groups of order q, $g_1$ a generator of $G_1$, $g_2$ a generator of $G_2$, and e a non-degenerate bilinear pairing e: $G_1 \times G_2 \rightarrow G_T$.

The arithmetic circuit can be represented in the form of a multi-QAP Q=($\{B_b\}_{b\in[1,l]}$, t, V, W, Y) of size $\rho$ and degree $\delta$, with $\{B_b\}_{b\in[1,l]}$ a set of l banks $B_b$ of Q used in computing the function F, and V={vi}, W={wi}, Y={yi} with $0 \le i \le \rho$.

During the generation step E3 by the client device of a public evaluation key and a public verification key, random variables s, $\{(\alpha_{bv}, \alpha_{bw}, \alpha_{by}, \beta_b, \gamma_b)\}_{b\in[1,l]}$, $r_v$, $r_w$ are generated in $\mathbb{Z}_q$.

Next, the following coefficients are defined: $r_y = r_v \cdot r_w$, $g_{v1} = g_1^{r_v}$, $g_{v2} = g_2^{r_v}$, $g_{w1} = g_1^{r_w}$, $g_{w2} = g_2^{r_w}$, $g_{y1} = g_1^{r_y}$ and $g_{y2} = g_2^{r_y}$.

The public evaluation key $EK_F$ is generated as equal to:

$$(\{EK_{Fb}\}_{b\in[1,l]}, \{g_1^{s^i}\}_{i\in[1,\delta]}, g_{v1}^{t(s)}, g_{w1}^{t(s)}, g_{y1}^{t(s)}, g_{v2}^{t(s)}, g_{w2}^{t(s)}, g_{y2}^{t(s)})$$

Each public bank key $EK_{Fb}$ is equal to ($EK_{Fb1}$, $EK_{Fb2}$) and generated by computing:

$$EK_{Fb1} = \left\{ \begin{array}{c} \{g_{v1}^{v_i(s)}, g_{w1}^{w_i(s)}, g_{y1}^{y_i(s)}, g_{v1}^{\alpha_{bv} \cdot v_i(s)}, g_{w1}^{\alpha_{bw} \cdot w_i(s)}, g_{y1}^{\alpha_{by} \cdot y_i(s)}, \\ g_{v1}^{\beta_b \cdot v_i(s)} \cdot g_{w1}^{\beta_b \cdot w_i(s)} \cdot g_{y1}^{\beta_b \cdot y_i(s)} \end{array} \right\}_{i\in B_b},$$

$$g_{v1}^{\alpha_{bv} \cdot t(s)}, g_{w1}^{\alpha_{bw} \cdot t(s)}, g_{y1}^{\alpha_{by} \cdot t(s)}, g_{v1}^{\beta_b \cdot t(s)}, g_{w1}^{\beta_b \cdot t(s)}, g_{y1}^{\beta_b \cdot t(s)}$$

$$EK_{Fb2} = (\{g_{w2}^{w_i(s)}\}_{i\in B_b}, g_{w2}^{\alpha_{bw} \cdot t(s)}).$$

The public verification key $VK_F$ is also generated as equal to: $(\{VK_{Fb}\}_{b\in[1,l]}, g_1, g_2, g_{y2}^{t(s)})$. Each public bank key $VK_{Fb}$ is equal to ($g_2^{\alpha_{bv}}, g_2^{\alpha_{bw}}, g_2^{\alpha_{by}}, g_2^{\gamma_b}, g_2^{\beta_b \cdot \gamma_b}$).

The remote computation device obtains E4 the arithmetic circuit and the public evaluation key.

For each biometric datum of the entity, at least one matching value between said biometric datum and at least one reference biometric datum can then be determined E5 by the remote computation device by evaluating the arithmetic circuit received from the biometric data of the entity and the reference biometric data. The remote computation device evaluates each sub-function $F_\omega$ from the biometric data of the entity and the reference biometric data for obtaining the matching value and the values of the circuit.

Generation E6 by the remote computation device, for each determined matching value, of a proof of correction of the computation execution of the matching value can comprise for each l={1, . . . , L} a list of digests and proofs obtained as described hereinbelow.

Let $\Lambda \subseteq [1,l]$ be the set of indices $b \in [1,l]$ such that $T_{lb} \ne 0$ in the scheduling $\sigma = ((f_l, (T_{l1}, \ldots, T_{ll})))_{l \in [1,L]}$.

Hereinbelow the following: $\Gamma = \cup_{b \in \Sigma \Lambda} B_b$, $\{c_j\}_{j \in B_b}$ an instance of the bank $B_b$ and $\Delta = \{c_i\}_{i \in \Gamma}$ the set of values of $\Gamma$.

For each bank $B_b$ such as $b \in \Lambda$, the remote computation device generates pledging random variables $o_b = (o_{bv}, o_{bw}, o_{by})$ in $\mathbb{Z}_q$.

it then computes the digest $D_b$ equal to ($D_{b1}$, $D_{b2}$) from the instance of the bank of variables $B_b$: $B_b^{(T_{lb})} = \{c_i \in \Delta\}_{i \in B_b}$ and pledging random variables $o_b$. Such digests are such that:

if the bank $B_b$ is an input/output bank: $D_{b1} = (g_{v1}^{v^{(b)}(s)}, g_{y1}^{y^{(b)}(s)})$ and $D_{b2} = (g_{w1}^{w^{(b)}(s)})$, if the bank $B_b$ is not an input/output bank:

$$D_{b1} = \begin{pmatrix} g_{v1}^{v^{(b)}(s)}, g_{w1}^{w^{(b)}(s)}, g_{y1}^{y^{(b)}(s)}, g_{v1}^{\alpha_{bv} \cdot v^{(b)}(s)}, g_{w1}^{\alpha_{bw} \cdot w^{(b)}(s)}, g_{y1}^{\alpha_{by} \cdot y^{(b)}(s)}, \\ g_{v1}^{\beta_b \cdot v^{(b)}(s)} \cdot g_{w1}^{\beta_b \cdot w^{(b)}(s)} \cdot g_{y1}^{\beta_b \cdot y^{(b)}(s)} \end{pmatrix}$$

$$D_{b2} = (g_{w2}^{w^{(b)}(s)})$$

with:

$v^{(b)}(s) = \Sigma_{i \in B_b} c_i \cdot v_i(s) + o_{bv} \cdot t(s)$, $w^{(b)}(s) = \Sigma_{i \in B_b} c_i \cdot w_i(s) + o_{bw} \cdot t(s)$, $y^{(b)}(s) = \Sigma_{i \in B_b} c_i \cdot y_i(s) + o_{by} \cdot t(s)$, The remote computation device then determines a polynomial $h^{(l)}(x)$ such that $p^{(l)}(x) = h^{(l)}(x) \cdot t(x)$ with $p^{(l)}(x) = (v_0(x) + \Sigma_{i \in \Gamma} c_i \cdot v_j(x) + \Sigma_{b \in \Lambda} o_{bv} \cdot t(x)) \cdot (w_0(x) + \Sigma_{i \in \Gamma} c_i \cdot w_j(x) + \Sigma_{b \in \Lambda} o_{bw} \cdot t(x)) - (y_0(x) + \Sigma_{i \in \Gamma} c_i \cdot y_j(x) + \Sigma_{b \in \Lambda} o_{by} \cdot t(x))$ Finally, it computes a proof element $\pi^{(l)}$ equal to $g_1^{h^{(l)}(s)}$.

The remote computation device then transmits E7 the matching values and said generated proofs comprising the list of computed digests and proof elements to the client device.

The proofs received by the client device are of the form of: $D_1^{(1)}, \ldots, D_l^{(1)}, \pi^{(1)}, \ldots, D_1^{(L)}, \ldots, D_l^{(L)}, \pi^{(L)}$ where for all $l \in \{1, \ldots, L\}$ and $\in \{1, \ldots, l\}$:

$$D_b^{(l)} = \left( \left( g_{v1}^{V_b^{(l)}}, g_{w1}^{W_b^{(l)}}, g_{y1}^{Y_b^{(l)}}, g_{v1}^{V_b'^{(l)}}, g_{w1}^{W_b'^{(l)}}, g_{y1}^{Y_b'^{(l)}}, g_1^{Z_b^{(l)}} \right), \left( g_{w2}^{W_b^{(l)}} \right) \right)$$

and $\pi^{(l)} = g_1^{H^{(l)}}$.

Two verification implementation variants of the received proof E8 are specified hereinbelow.

In a first implementation variant, the client device then verifies each received proof by performing:

verification of $L \cdot e$ digests, for $l \in \{1, \ldots, L\}$ and $b \in \{1, \ldots, l\}$ comprising the following equality tests:

$$e\left( g_{v1}^{V_b'^{(l)}}, g_2^{\alpha_{bv}} \right) = e\left( g_{v1}^{V_b^{(l)}}, g_2 \right)$$

$$e\left( g_{w1}^{W_b'^{(l)}}, g_2^{\alpha_{bw}} \right) = e\left( g_{w1}^{W_b^{(l)}}, g_2 \right)$$

$$e\left( g_{y1}^{Y_b'^{(l)}}, g_2^{\alpha_{by}} \right) = e\left( g_{y1}^{Y_b^{(l)}}, g_2 \right)$$

$$e\left( g_1^{Z_b^{(l)}}, g_2^{\gamma_b} \right) = e\left( g_{v1}^{V_b^{(l)}} \cdot g_{w1}^{W_b^{(l)}} \cdot g_{y1}^{Y_b^{(l)}}, g_2^{\beta_b \cdot \gamma_b} \right)$$

verification of L proofs comprising for l∈{1, ..., L} the following equality test:

$$e\left(\prod_{b=1}^{\ell}\left(g_{v1}^{V_b^{(l)}}\right), \prod_{b=1}^{\ell}\left(g_{w2}^{W_b^{(l)}}\right)\right) = e(g_1^{H^{(l)}}, g_{y2}^{t(s)}) \cdot e\left(\prod_{b=1}^{\ell}\left(g_{y1}^{Y_b^{(l)}}\right), g_2\right)$$

In a second implementation variant, the client device then verifies each received proof by executing batch verification comprising, given a correction parameter λ:
  selection of a random vector $(d_1, \ldots, d_{3 \cdot l})$ of elements of size λ,
  batch verification of the L·l digests, in l times by executing the following equality tests, for b∈{1, ..., l}:

$$e\left(\prod_{i=1}^{L}\left(g_{v1}^{V_b'^{(l)}}\right)^{d_l}, g_2^{\alpha_{bv}}\right) \cdot$$

$$e\left(\prod_{i=1}^{L}\left(g_{w1}^{W_b'^{(l)}}\right)^{d_{L+l}}, g_2^{\alpha_{bw}}\right) \cdot e\left(\prod_{l=1}^{L}\left(g_{y1}^{Y_b'^{(l)}}\right)^{d_{2 \cdot L+l}}, g_2^{\alpha_{by}}\right) =$$

$$e\left(\prod_{i=1}^{L}\left(g_{v1}^{V_b^{(l)}}\right)^{d_l} \cdot \prod_{l=1}^{L}\left(g_{w1}^{W_b^{(l)}}\right)^{d_{L+l}} \cdot \prod_{l=1}^{L}\left(g_{y1}^{Y_b^{(l)}}\right)^{d_{2 \cdot L+l}}, g_2\right)$$

$$e\left(\prod_{l=1}^{L}\left(g_1^{Z_b^{(l)}}\right)^{d_l}, g_e^{\gamma_b}\right) = e\left(\prod_{l=1}^{L}\left(g_{v1}^{V_b^{(l)}} \cdot g_{w1}^{W_b^{(l)}} \cdot g_{y1}^{Y_b^{(l)}}\right)^{d_l}, g_2^{\beta_b \cdot \gamma_b}\right)$$

batch verification the L proofs by executing the following equality test:

$$\prod_{l=1}^{L} e\left(\prod_{b=1}^{\ell}\left(g_{v1}^{V_b^{(l)}}\right)^{d_l}, \prod_{b=1}^{\ell}\left(g_{w2}^{W_b^{(l)}}\right)\right) =$$

$$e\left(\prod_{l=1}^{L}(g_1^{H^{(l)}})^{d_l}, g_{y2}^{t(s)}\right) \cdot e\left(\prod_{l=1}^{L}\prod_{b=1}^{\ell}\left(g_{y1}^{Y_b^{(l)}}\right)^{d_l}, g_2\right),$$

and as a verification option of the belonging of elements on which the pairings is applied to their respective groups.

The method performed carries out biometric identification by comparing biometric data in terms of the scope of a publicly verifiable computation protocol and minimizing the time necessary for production and verification of proofs relative to proper execution of this computation, by way of minimization of the number of multipliers employed to represent this computation in the form of an arithmetic circuit.

The invention claimed is:
1. A biometric identification method of an entity, by a biometric
  identification system comprising a client device and a remote computation device, comprising: computation of at least one matching value between at least one biometric datum of the entity u and at least one reference biometric datum u', by application of a function F to said biometric data, each of said data being a vector of N binary integers $u_i$ or $u'_i$ with $1 \leq i \leq N$, each integer being coded on n bits, said function F comprising a scalar product between a biometric datum of the entity and a reference biometric datum, said computation performing a non-interactive, publicly verifiable computation method comprising steps of:
  representation of said function F in form of an arithmetic circuit comprising wires transporting values of finite prime field $\mathbb{Z}_q$, with q a prime number, and connecting addition and multiplication operators,
  conversion of said arithmetic circuit into a polynomial representation, QAP (Quadratic Arithmetic Program) or multi-QAP,
  generation of a public evaluation key and of a public verification key as a function of said polynomial representation,
  obtaining by the remote computation device of the arithmetic circuit and of the public evaluation key,
  for each biometric datum of the entity, determination of at least one matching value between said biometric datum and at least one reference biometric datum by the remote computation device by evaluating the arithmetic circuit having as inputs the biometric datum of the entity and the reference biometric datum,
  for each determined matching value, generation by the remote computation device of a proof of correction of computation execution of matching value, so-called generated proof, from said polynomial representation, the public evaluation key and result of the evaluation of the arithmetic circuit,
  transmission by the remote computation device of matching values and generated proofs to the client device,
  verification of said generated proofs received by the client device by means of the public verification key,
  identification of the entity by the client device as the function of the matching values and result of said verification of the generated proofs,
  wherein:
  representation of said function F comprises encoding an integer k>1 of binary integers of a vector of a biometric datum on at least one input wire of the arithmetic circuit,
  and the function F comprising at least m scalar products, m being a divider of length N of biometric data vectors,
  if the divider m is equal to 2 or 3,
  the arithmetic circuit comprises at least N/(k*m) multiplication operators connected to input wires of the arithmetic circuit, a storage memory, and at least one addition operator, and evaluation of the arithmetic circuit iteratively comprises computation of each of the m scalar products by means of said N/(k*m) multiplication operators, storage of m results of computations of said scalar products in said storage memory and summation of said results by means of said addition operator, if the divider m is greater than or equal to 4,
  the arithmetic circuit comprises at least one first computation sub-circuit of the scalar product comprising N/(k*m) first multiplication operators connected to input wires of the arithmetic circuit and a first storage memory, and a second computation sub-circuit of the scalar product comprising N/(k*m) second multiplication operators connected to the input wires of the arithmetic circuit and a second storage memory, each one of said first and second computation sub-circuits being also connected to an output of the storage memory of the other one of said first and second computation sub-circuits,
  and evaluation of the arithmetic circuit iteratively comprises computation of each of the m scalar products by using alternatively one of said first and second com- putation sub-circuit to compute sum of the scalar product of values of the input wires of the used one of said first and second computation sub-circuits and value stored in the storage memory of the other one of said first and second computation sub-circuits, wherein said biometric identification method delegates to a remote entity a comparison of biometric datum in terms of a protocol of verifiable computations suitable for a real-time execution.

2. The identification method according to claim 1, wherein the verification of said received proofs comprises batch verification of pairings.

3. The identification method according to claim 1, wherein:
if the divider m of the length N of the biometric data vectors is equal to 1,
given an asymmetric bilinear environment $(q, G_1, G_2, G_T, g_1, g_2, e)$ where q is a prime number $G_1$, $G_2$ and $G_T$ three groups of order q, $g_1$ a generator of $G_1$, $g_2$ a generator of $G_2$, and e a non-degenerate bilinear pairing e: $G_1 \times G_2 \rightarrow G_T$ and the arithmetic circuit being represented in form of a QAP of the circuit Q=(t, V, W, Y) of size $\rho$ and degree $\delta$, with V={vi}, W={wi}, Y={yi}, $0 \leq i \leq \rho$,
and given $I_{io} = \{1, \ldots, \theta\}$ set of indices corresponding to input/output wires of the arithmetic circuit and $I_{mid} = \{\theta+1, \ldots, \rho\}$ set of indices of intermediate wires of the arithmetic circuit not being input wires of the arithmetic circuit,
the generation of the public evaluation key and of the public verification key comprises:
generation of random variables $r_v$, $r_w$, s, $\alpha_v$, $\alpha_w$, $\alpha_y$, $\beta$, $\gamma$ in $\mathbb{Z}_q$,
definition of coefficients $r_y = r_v \cdot r_w$, $g_{v1} = g_1^{r_v}$, $g_{w1} = g_1^{r_w}$, $g_{w2} = g_2^{r_w}$, $g_{y1} = g_1^{r_y}$ and $g_{y2} = g_2^{r_y}$, generation of public evaluation key $EK_F$ equal to $(EK_{F1}, EK_{F2})$ where $$EK_{F1} = \begin{pmatrix} \{g_{v1}^{v_i(s)}\}_{i \in I_{mid}}, \{g_{w1}^{w_i(s)}\}_{i \in I_{mid}}, \{g_{y1}^{y_i(s)}\}_{i \in I_{mid}}, \\ \{g_{v1}^{\alpha_v \cdot v_i(s)}\}_{i \in I_{mid}}, \{g_{w1}^{\alpha_w \cdot w_i(s)}\}_{i \in I_{mid}}, \{g_{y1}^{\alpha_y \cdot y_i(s)}\}_{i \in I_{mid}}, \\ \{g_1^{s^i}\}_{i \in [1,\delta]}, \{g_{v1}^{\beta \cdot v_i(s)} \cdot g_{w1}^{\beta \cdot w_i(s)} \cdot g_{y1}^{\beta \cdot y_i(s)}\}_{i \in I_{mid}} \end{pmatrix}$$

$$EK_{F2} = \left(\{g_{w2}^{w_i(s)}\}_{i \in I_{mid}}\right)$$

generation of public verification key $VK_F$ equal to $(VK_{F1}, VK_{F2})$ where:

$VK_{F1} = (g_1, \{g_{v1}^{v_i(s)}\}_{i \in [1,\theta]}, \{g_{y1}^{y_i(s)}\}_{i \in [1,\theta]})$ $VK_{F2} = (g_2, g_2^{\alpha_v}, g_2^{\alpha_w}, g_2^{\alpha_y}, g_2^{\gamma}, g_2^{\beta \cdot \gamma}, g_{y2}^{t(s)}, \{g_{w2}^{w_i(s)}\}_{i \in [1,\theta]})$ generation by the remote computation device of the proof of correction of the computation execution of a matching value comprises, $\{c_i\}_{i \in [1,\rho]}$ being set of values of the arithmetic circuit determined during determination of the determined matching value:
determination of a polynomial h(x) such that $p(x) = h(x) \cdot t(x)$ with $p(x) = (v_0(x) + \Sigma_{i=1}^{\rho} c_i \cdot v_i(x)) \cdot (w_0(x) + \Sigma_{i=1}^{\rho} c_i \cdot w_i(x)) - (y_0(x) + \Sigma_{i=1}^{\rho} c_i \cdot y_i(x))$,
computation of generated proof $\pi = (\pi_1, \pi_2)$ with:

$$\pi_1 = \begin{pmatrix} g_{v1}^{v_{mid}(s)}, g_{w1}^{w_{mid}(s)}, g_{y1}^{y_{mid}(s)}, g_1^{h(s)}, \\ g_{v1}^{\alpha_v \cdot v_{mid}(s)}, g_{w1}^{\alpha_w \cdot w_{mid}(s)}, g_{y1}^{\alpha_y \cdot y_{mid}(s)}, \\ g_{v1}^{\beta \cdot v_{mid}(s)} \cdot g_{w1}^{\beta \cdot w_{mid}(s)} \cdot g_{y1}^{\beta \cdot y_{mid}(s)} \end{pmatrix}$$

-continued $$\pi_2 = \left(g_{w2}^{w_{mid}(s)}\right)$$

where:

$v_{mid}(x) = \Sigma_{i \in I_{mid}} c_i \cdot v_i(x), w_{mid}(x) = \Sigma_{i \in I_{mid}} c_i \cdot w_i(x)$ and $y_{mid}(x) = \Sigma_{i \in I_{mid}} c_i \cdot y_i(x)$, and, wherein said proofs received by the client device being equal to $(\pi_{r1}, \pi_{r2})$ with $\pi_{r1}$ in form of: $(g_{v1}^{V_{mid}}, g_{w1}^{W_{mid}}, g_{y1}^{Y_{mid}}, g_1^H, g_{v1}^{V'_{mid}}, g_{w1}^{W'_{mid}}, g_{y1}^{Y'_{mid}}, g_1^Z)$ and $\pi_{r2}$ in the form $g_{w2}^{W_{mid}}$, the verification of a received proof comprises performing following equality tests:

$e(g_{v1}^{v_o(s)} \cdot g_{v1}^{v_{io}(s)} \cdot g_{v1}^{V_{mid}}, g_{w2}^{w_o(s)} \cdot g_{w2}^{w_{io}(s)} \cdot g_{w2}^{W_{mid}}) = e(g_1^H, g_{y2}^{t(s)}) \cdot e(g_{y1}^{y_o(s)} \cdot g_{y1}^{y_{io}(s)} \cdot g_{y1}^{Y_{mid}}, g_2)$, $e((g_{v1}^{V_{mid}})^{d_1} \cdot (g_{v1}^{W'_{mid}})^{d_2} \cdot (g_{v1}^{Y_{mid}})^{d_3}, g_2) = e((g_{v1}^{V_{mid}})^{d_1}, g_2^{\alpha_v}) \cdot e(g_{w1}^{W'_{mid}}{}^{d_2}, g_2^{\alpha_w}) \cdot e((g_{y1}^{Y_{mid}})^{d_3}, g_2^{\alpha_y}), e((g_1^Z, g_2^{\gamma}) = e(g_{v1}^{V_{mid}} \cdot g_{w1}^{W_{mid}} \cdot g_{y1}^{Y_{mid}}, g_2^{\beta \cdot \gamma})$ where $g_{v1}^{v_{io}(s)} = \Pi_{i=1}^{\theta}(g_{v1}^{v_i(s)})^{c_i}$, $g_{w1}^{w_{io}(s)} = \Pi_{i=1}^{\theta}(g_{w1}^{w_i(s)})^{c_i}$, and $g_{y1}^{y_{io}(s)} = \Pi_{i=1}^{\theta}(g_{y1}^{y_i(s)})^{c_i}$ and $(d_1, d_2, d_3)$ elements of $\mathbb{Z}_q$ on $\lambda$ bits with $\lambda$ a security parameter.

4. The identification method according to claim 1 wherein:
if the divider m of the length N of the biometric data vectors is greater than or equal to 2,
given an asymmetric bilinear environment $(q, G_1, G_2, G_T, g_1, g_2, e)$ where q is a prime number $G_1$, $G_2$ and $G_T$ three groups of order q, $g_1$ a generator of $G_1$, $g_2$ a generator of $G_2$, and e a non-degenerate bilinear pairing e: $G_1 \times G_2 \rightarrow G_T$, the arithmetic circuit being represented in form of a multi-QAP $Q = (\{B_b\}_{b \in [1,l]}, t, V, W)$, of size $\rho$ and degree $\delta$, with $\{B_b\}_{b \in [1,l]}$ a set of l banks $B_b$ of Q used in the computation of the function F, and V={vi}, W={wi}, Y={yi} with $0 \leq i \leq \rho$,
the generation of the public evaluation key and of the public verification key comprises:
generation of random variables s, $\{(\alpha_{bv}, \alpha_{bw}, \alpha_{by}, \beta_b, \gamma_b)\}_{b \in [1,l]}$, $r_v$, $r_w$ in $\mathbb{Z}_q$,
definition of following coefficients: $r_y = r_v \cdot r_w$, $g_{v1} = g_1^{r_v}$, $g_{v2} = g_2^{r_v}$, $g_{w1} = g_1^{r_w}$, $g_{w2} = g_2^{r_w}$, $g_{y1} = g_1^{r_y}$ and $g_{y2} = g_2^{r_y}$,
generation of public evaluation key $EK_F$ equal to:

$(\{EK_{Fb}\}_{b \in [1,l]}, \{g_1^{s^i}\}_{i \in [1,\delta]}, g_{v1}^{t(s)}, g_{w1}^{t(s)}, g_{y1}^{t(s)}, g_{v2}^{t(s)}, g_{w2}^{t(s)}, g_{y2}^{t(s)})$ where each public bank key $EK_{Fb}$ is equal to $(EK_{Fb1}, EK_{Fb2})$ with:

$$EK_{Fb1} = \begin{pmatrix} \left\{\begin{matrix} g_{v1}^{v_i(s)}, g_{w1}^{w_i(s)}, g_{y1}^{y_i(s)}, g_{v1}^{\alpha_{bv} \cdot v_i(s)}, g_{w1}^{\alpha_{bw} \cdot w_i(s)}, g_{y1}^{\alpha_{by} \cdot y_i(s)}, \\ g_{v1}^{\beta_b \cdot v_i(s)} \cdot g_{w1}^{\beta_b \cdot w_i(s)} \cdot g_{y1}^{\beta_b \cdot y_i(s)} \end{matrix}\right\}_{i \in B_b}, \\ g_{v1}^{\alpha_{bv} \cdot t(s)}, g_{w1}^{\alpha_{bw} \cdot t(s)}, g_{y1}^{\alpha_{by} \cdot t(s)}, g_{v1}^{\beta_b \cdot t(s)}, g_{w1}^{\beta_b \cdot t(s)}, g_{y1}^{\beta_b \cdot t(s)} \end{pmatrix}$$

$EK_{Fb2} = (\{g_{w2}^{w_i(s)}\}_{i \in B_b}, g_{w2}^{\alpha_{bw} \cdot t(s)})$ generation of the public verification key $VK_F$ equal to: $(\{VK_{Fb}\}_{b \in [1,l]}, g_1, g_2, g_{y2}^{t(s)})$ where each public bank key $VK_{Fb}$ is equal to $(g_2^{\alpha_{bv}}, g_2^{\alpha_{bw}}, g_2^{\alpha_{by}}, g_2^{\gamma_b}, g_2^{\beta_b \cdot \gamma_b})$,
determination of a matching value comprises, function F being divided into $\omega$ sub-functions $F_1, \ldots, F_\omega$ and $\sigma = ((f_l, (T_{l1}, \ldots, T_{ll})))_{l \in [1,L]}$ being a scheduling of length L with $f_l \in \{1, \ldots, \omega\}$, evaluation of each sub-function $F_\omega$ from the biometric data of the entity and the reference biometric data and determination of the values of the arithmetic circuit, generation by the remote computation device of the proof of correction of the computation execution of a matching value comprises, for each l={1, . . . , L}:
for each bank $B_b$ such that b∈Λ, with Λ⊆[1,l] set of indices b∈[1,l] such that $T_{lb}\neq 0$, Γ=$∪_{b∈Λ}B_b$, $\{c_j\}_{j∈B_b}$ an instance of bank $B_b$, Δ=$\{c_i\}_{i∈Γ}$ set of values of Γ:
generation of pledging random variables in $\mathbb{Z}_q$: $o_b=(o_{bv}, o_{bw}, o_{by})$,
computation of a digest $D_b$ equal to $(D_{b1},D_{b2})$ from the instance of the bank $B_b$: $B_b^{(Tb)}=\{c_i∈Δ\}_{i∈B_b}$ and pledging random variables $o_b$ and such that:
if the bank $B_b$ is an input/output bank:

$$D_{b1}=(g_{v1}^{v^{(b)}(s)}, g_{y1}^{y^{(b)}(s)}) \text{ and } D_{b2}=(g_{w2}^{w^{(b)}(s)}),$$

if the bank $B_b$ is not input/output bank:

$$D_{b1} = \begin{pmatrix} g_{v1}^{v^{(b)}(s)}, g_{w1}^{w^{(b)}(s)}, g_{y1}^{y^{(b)}(s)}, g_{v1}^{\alpha_{bv}\cdot v^{(b)}(s)}, g_{w1}^{\alpha_{bw}\cdot w^{(b)}(s)}, g_{y1}^{\alpha_{by}\cdot y^{(b)}(s)}, \\ g_{v1}^{\beta_b\cdot v^{(b)}(s)} \cdot g_{w1}^{\beta_b\cdot w^{(b)}(s)} \cdot g_{y1}^{\beta_b\cdot y^{(b)}(s)} \end{pmatrix}$$

$$D_{b2} = \left(g_{w2}^{w^{(b)}(s)}\right)$$

with:

$v^{(b)}(s)=\Sigma_{i∈B_b}c_i\cdot v_i(s)+o_{bv}\cdot t(s)$, $w^{(b)}(s)=\Sigma_{i∈B_b}c_i\cdot w_i(s)+o_{bw}\cdot t(s)$, $y^{(b)}(s)=\Sigma_{i∈B_b}c_i\cdot y_i(s)+o_{by}\cdot t(s)$, determination of a polynomial $h^{(l)}(x)$ such that $p^{(l)}(x)=h^{(l)}(x)\cdot t(x)$ with $p^{(l)}(x)=(v_0(x)+\Sigma_{i∈Γ}c_i\cdot v_j(x)+\Sigma_{b∈Λ}o_{bv}\cdot t(x))\cdot(w_0(x)+\Sigma_{i∈Γ}c_i\cdot w_j(x)+\Sigma_{b∈Λ}o_{bw}\cdot t(x))-(y_0(x)+\Sigma_{i∈Γ}c_i\cdot y_j(x)+\Sigma_{b∈Λ}o_{by}\cdot t(x))$
computation of a proof element $\pi^{(l)}$ equal to $g_1^{h^{(l)}(s)}$,
and, wherein said proofs received by the client device being of the form $D_1^{(1)}, \ldots, D_l^{(1)}, \pi^{(1)}, \ldots, D_1^{(L)}, \ldots, D_l^{(L)}, \pi^{(L)}$ where for all l∈{1, . . . , L} and b∈{1, . . . ,l}:

$$D_b^{(l)} = \left(\left(g_{v1}^{V_b^{(l)}}, g_{w1}^{W_b^{(l)}}, g_{y1}^{Y_b^{(l)}}, g_{v1}^{V_b'^{(l)}}, g_{w1}^{W_b'^{(l)}}, g_{y1}^{Y_b'^{(l)}}, g_1^{Z_b^{(l)}}\right), \left(g_{w2}^{W_b^{(l)}}\right)\right)$$

and
$\pi^{(l)}=g_1^{H^{(l)}}$, verification of the received proof comprises:
verification of L·l digests, for l∈{1, . . . , L} and b∈{1, . . . , l} comprising performing following equality tests:

$$e\left(g_{v1}^{V_b^{(l)}}, g_2^{\alpha_{bv}}\right) = e\left(g_{v1}^{V_b'^{(l)}}, g_2\right)$$

$$e\left(g_{w1}^{W_b^{(l)}}, g_2^{\alpha_{bw}}\right) = e\left(g_{w1}^{W_b'^{(l)}}, g_2\right)$$

$$e\left(g_{y1}^{Y_b^{(l)}}, g_2^{\alpha_{by}}\right) = e\left(g_{y1}^{Y_b'^{(l)}}, g_2\right)$$

$$e\left(g_1^{Z_b^{(l)}}, g_2^{\gamma_b}\right) = e\left(g_{v1}^{V_b^{(l)}} \cdot g_{w1}^{W_b^{(l)}} \cdot g_{y1}^{Y_b^{(l)}}, g_2^{\beta_b\cdot\gamma_b}\right)$$

verification of L proofs comprising for l∈{1, . . . , L} performing following equality test:

$$e\left(\prod_{b=1}^{\ell}\left(g_{v1}^{V_b^{(l)}}\right), \prod_{b=1}^{\ell}\left(g_{w2}^{W_b^{(l)}}\right)\right) = e\left(g_1^{H^{(l)}}, g_{y2}^{t(s)}\right) \cdot e\left(\prod_{b=1}^{\ell}\left(g_{y1}^{Y_b^{(l)}}\right), g_2\right).$$

5. The identification method according to claim 1 wherein:
if the divider m of the length N of the biometric data vectors is greater than or equal to 2, given an asymmetric bilinear environment (q, $G_1$, $G_2$, $G_T$, $g_1$, $g_2$, e) where q is a prime number $G_1$, $G_2$ and $G_T$ three groups of order q, $g_1$ a generator of $G_1$, $g_2$ a generator of $G_2$, and e a non-degenerate bilinear pairing e: $G_1×G_2→G_T$, the arithmetic circuit being represented in form of a multi-QAP Q=($\{B_b\}_{b∈[1,l]}$, t, V, W, of size ρ and degree δ, with $\{B_b\}_{b∈[1,l]}$ a set of l banks $B_b$ of Q used in computation of the function F, and V={$v_i$}, W={$w_i$}, Y={$y_i$} with 0≤i≤ρ,
the generation of the public evaluation key and the public verification key comprises:
generation of random variables s,$\{(\alpha_{bv},\alpha_{bw},\alpha_{by}, \beta_b, \gamma_b)\}_{b∈[1,l]}$, $r_v$, $r_w$ in $\mathbb{Z}_q$,
generation of random variables s,$\{(\alpha_{bv}, \alpha_{bw}, \alpha_{by}, \beta_b, \gamma_b)\}_{b∈[1,l]}$, $r_v$, $r_w$ in $\mathbb{Z}_q$,
definition of the following coefficients: $r_y=r_b\cdot r_w$, $g_{v1}=g_1^{r_v}$, $g_{v2}=g_2^{r_v}$, $g_{w1}=g_1^{r_w}$, $g_{w2}=g_2^{r_w}$, $g_{y1}=g_1^{r_y}$ and $g_{y2}=g_2^{r_y}$,
generation of the public evaluation key $EK_F$ equal to:

$$(\{EK_{Fb}\}_{b∈[1,l]}, \{g_1^{s^i}\}_{i∈[1,\delta]}, g_{v1}^{t(s)}, g_{w1}^{t(s)}, g_{y1}^{t(s)}, g_{v2}^{t(s)}, g_{w2}^{t(s)}, g_{y2}^{t(s)})$$

where each public bank key $EK_{Fb}$ is equal to ($EK_{Fb1}$, $EK_{Fb2}$) with:

$$EK_{Fb1} = \left\{\begin{matrix} \left\{g_{v1}^{v_i(s)}, g_{w1}^{w_i(s)}, g_{y1}^{y_i(s)}, g_{v1}^{\alpha_{bv}\cdot v_i(s)}, g_{w1}^{\alpha_{bw}\cdot w_i(s)}, g_{y1}^{\alpha_{by}\cdot y_i(s)},\right\} \\ g_{v1}^{\beta_b\cdot v_i(s)} \cdot g_{w1}^{\beta_b\cdot w_i(s)} \cdot g_{y1}^{\beta_b\cdot y_i(s)} \end{matrix}\right\}_{i∈B_b},$$
$$g_{v1}^{\alpha_{bv}\cdot t(s)}, g_{w1}^{\alpha_{bw}\cdot t(s)}, g_{y1}^{\alpha_{by}\cdot t(s)}, g_{v1}^{\beta_b\cdot t(s)}, g_{w1}^{\beta_b\cdot t(s)}, g_{y1}^{\beta_b\cdot t(s)}$$

$$EK_{Fb2} = \left(\{g_{w2}^{w_i(s)}\}_{i∈B_b}, g_{w2}^{\alpha_{bw}\cdot t(s)}\right)$$

generation of the public verification key $VK_F$ is equal to: ($\{VK_{Fb}\}_{b∈[1,l]}$, $g_1$, $g_2$, $g_{y2}^{t(s)}$) where each public bank key $VK_{Fb}$ is equal to ($g_2^{\alpha_{bv}}$, $g_2^{\alpha_{bw}}$, $g_2^{\alpha_{by}}$, $g_2^{\gamma_b}$, $g_2^{\beta_b\cdot\gamma_b}$),
determination of the matching value comprises, function F being divided into ω sub-functions $F_1, \ldots, F_\omega$ and σ=(($f_l$, ($T_{l1}, \ldots, T_{ll}$)))$_{l∈[1,L]}$ being a scheduling of length L with $f_l$ ∈{1, . . . , ω}, evaluation of each sub-function $F_\omega$ from the biometric data of the entity and the reference biometric data and determination of the determined values of the arithmetic circuit,
generation by the remote computation device of the proof of correction of the computation execution of the matching value comprises, for each l={1, . . . , L}:
for each bank $B_b$ such that b∈Λ, with Λ⊆[1,l] the set of indices b∈[1,l] such that $T_{lb}\neq 0$, Γ=$∪_{b∈Λ}B_b$, $\{c_j\}_{j∈B_b}$ an instance of the bank $B_b$, Δ=$\{c_i\}_{i∈Γ}$ the set of values of Γ:
generation of pledging random variables in $\mathbb{Z}_q$: $o_b=(o_{bv}, o_{bw}, o_{by})$,
computation of a digest $D_b$ equal to $(D_{b1},D_{b2})$ from the instance of the bank $B_b$: $B_b^{(Tb)}=\{c_i∈Δ\}_{i∈B_b}$ and pledging random variables $o_b$ and such that:
if the bank $B_b$ is input/output bank:

$$D_{b1}=(g_{v1}^{v^{(b)}(s)}, g_{y1}^{y^{(b)}(s)}) \text{ and } D_{b2}=(g_{w2}^{w^{(b)}(s)}),$$

if the bank $B_b$ is not the input/output bank:

$$D_{b1} = \begin{pmatrix} g_{v1}^{v^{(b)}(s)}, g_{w1}^{w^{(b)}(s)}, g_{y1}^{y^{(b)}(s)}, g_{v1}^{\alpha_{bv} \cdot v^{(b)}(s)}, g_{w1}^{\alpha_{bw} \cdot w^{(b)}(s)}, g_{y1}^{\alpha_{by} \cdot y^{(b)}(s)}, \\ g_{v1}^{\beta_b \cdot v^{(b)}(s)} \cdot g_{w1}^{\beta_b \cdot w^{(b)}(s)} \cdot g_{y1}^{\beta_b \cdot y^{(b)}(s)} \end{pmatrix}$$

$$D_{b2} = \left( g_{w2}^{w^{(b)}(s)} \right)$$

with:

$v^{(b)}(s) = \Sigma_{i \in B_b} c_i \cdot v_i(s) + o_{bv} \cdot t(s)$, $w^{(b)}(s) = \Sigma_{i \in B_b} c_i \cdot w_i(s) + o_{bw} \cdot t(s)$, $y^{(b)}(s) = \Sigma_{i \in B_b} c_i \cdot y_i(s) + o_{by} \cdot t(s)$, determination of a polynomial $h^{(l)}(x)$ such that $p^{(l)}(x) = h^{(l)}(x) \cdot t(x)$ with $p^{(l)}(x) = (v_0(x) + \Sigma_{i \in \Gamma} c_i \cdot v_j(x) + \Sigma_{b \in \Lambda} o_{bv} \cdot t(x)) \cdot (w_0(x) + \Sigma_{i \in \Gamma} c_i \cdot w_j(x) + \Sigma_{b \in \Lambda} o_{bw} \cdot t(x)) - (y_0(x) + \Sigma_{i \in \Gamma} c_i \cdot y_j(x) + \Sigma_{b \in \Lambda} o_{by} \cdot t(x))$ computation of the proof element $\pi^{(l)}$ equal to $g_1^{h^{(l)}(s)}$, and, wherein said proofs received by the client device being of form $D_1^{(1)}, \ldots, D_l^{(1)}, \pi^{(1)}, \ldots, D_1^{(L)}, \ldots, D_l^{(L)}, \pi^{(L)}$ where for all $l \in \{1, \ldots, L\}$ and $b \in \{1, \ldots, l\}$:

$$D_b^{(l)} = \left( \left( g_{v1}^{V_b^{(l)}}, g_{w1}^{W_b^{(l)}}, g_{y1}^{Y_b^{(l)}}, g_{v1}^{V_b'^{(l)}}, g_{w1}^{W_b'^{(l)}}, g_{y1}^{Y_b'^{(l)}}, g_1^{Z_b^{(l)}} \right), \left( g_{w2}^{W_b^{(l)}} \right) \right)$$

and
$\pi^{(l)} = g_1^{H^{(l)}}$, verification of the received proof comprises, given a correction parameter $\lambda$:

selection of a random vector $(d_1, \ldots, d_{3 \cdot l})$ of elements of size $\lambda$, batch verification of L·l digests comprising performing 1 times the following equality tests, for $b \in \{1, \ldots, l\}$:

$$e\left( \prod_{l=1}^{L} \left( g_{v1}^{V_b'^{(l)}} \right)^{d_l}, g_2^{\alpha_{bv}} \right) \cdot$$

$$e\left( \prod_{l=1}^{L} \left( g_{w1}^{W_b'^{(l)}} \right)^{d_{L+l}}, g_2^{\alpha_{bw}} \right) \cdot e\left( \prod_{l=1}^{L} \left( g_{y1}^{Y_b'^{(l)}} \right)^{d_{2 \cdot L+l}}, g_2^{\alpha_{by}} \right) =$$

$$e\left( \prod_{l=1}^{L} \left( g_{v1}^{V_b^{(l)}} \right)^{d_l} \cdot \prod_{l=1}^{L} \left( g_{w1}^{W_b^{(l)}} \right)^{d_{L+l}} \cdot \prod_{l=1}^{L} \left( g_{y1}^{Y_b^{(l)}} \right)^{d_{2 \cdot L+l}}, g_2 \right)$$

$$e\left( \prod_{l=1}^{L} \left( g_1^{Z_b^{(l)}} \right)^{d_l}, g_2^{\gamma_b} \right) = e\left( \prod_{l=1}^{L} \left( g_{v1}^{V_b^{(l)}} \cdot g_{w1}^{W_b^{(l)}} \cdot g_{y1}^{Y_b^{(l)}} \right)^{d_l}, g_2^{\beta_b \cdot \gamma_b} \right)$$

batch verification of the L proofs comprising performing the following equality test:

$$\prod_{l=1}^{L} e\left( \prod_{b=1}^{\ell} \left( g_{v1}^{V_b^{(l)}} \right)^{d_l}, \prod_{b=1}^{\ell} \left( g_{w2}^{W_b^{(l)}} \right) \right) =$$

$$e\left( \prod_{l=1}^{L} \left( g_1^{H^{(l)}} \right)^{d_l}, g_{y2}^{t(s)} \right) \cdot e\left( \prod_{l=1}^{L} \prod_{b=1}^{\ell} \left( g_{y1}^{Y_b^{(l)}} \right)^{d_l}, g_2 \right)$$

6. The identification method according to claim 1, wherein the identification of the entity comprises comparison of the matching values with a predetermined threshold.

7. The identification method according to claim 1, wherein the function F comprises comparison of result of the scalar product between said biometric data of the entity and said reference biometric data with a predetermined threshold.

8. The identification method according to claim 1, wherein the encoding of k binary integers $u_i$ or $u'_i$ on an input wire of an $j^{th}$ multiplication operator, $1 \leq j \leq N/k$, is equal to $$E_k^{\left(\frac{(z-1)N}{m} + (j-1)k+1\right)}(u) \text{ or } E_k^{\left(\frac{(z-1)N}{m} + (j-1)k+1\right)}(u')$$

with $1 \leq z \leq m$, and is given by the formula:

$$E_k^{((j-1)k+1)}(x) = \sum_{i=1}^{k} 2^{\varepsilon_i} \cdot x_{(j-1)k+i} = 2^{\varepsilon_1} \cdot x_{(j-1)k+1} + \ldots + 2^{\varepsilon_k} \cdot x_{(j-1)k+k}$$

with $\varepsilon_1, \ldots, \varepsilon_k$ predetermined integers.

9. A computer program product comprising code instructions for execution of a method according to a biometric identification method of an entity, by a biometric identification system comprising a client device and a remote computation device, comprising:

computation of at least one matching value between at least one biometric datum of the entity u and at least one reference biometric datum u', by application of a function F to said biometric data, each of said data being a vector of N binary integers $u_i$ or $u'_i$ with $1 \leq i \leq N$, each integer being coded on n bits, said function F comprising a scalar product between a biometric datum of the entity and a reference biometric datum, said computation performing a non-interactive, publicly verifiable computation method comprising steps of:

representation of said function F in form of an arithmetic circuit comprising wires transporting values of finite prime field $\mathbb{Z}_q$, with q a prime number, and connecting addition and multiplication operators, conversion of said arithmetic circuit into a polynomial representation, QAP (Quadratic Arithmetic Program) or multi-QAP, generation of a public evaluation key and of a public verification key as a function of said polynomial representation, obtaining by the remote computation device of the arithmetic circuit and of the public evaluation key, for each biometric datum of the entity, determination of at least one matching value between said biometric datum and at least one reference biometric datum by the remote computation device by evaluating the arithmetic circuit having as inputs the biometric datum of the entity and the reference biometric datum, for each determined matching value, generation by the remote computation device of a proof of correction of computation execution of matching value, so-called generated proof, from said polynomial representation, the public evaluation key and result of the evaluation of the arithmetic circuit, transmission by the remote computation device of matching values and generated proofs to the client device, verification of said generated proofs received by the client device by means of the public verification key, identification of the entity by the client device as the function of the matching values and result of said verification of the generated proofs, wherein:

representation of said function F comprises encoding an integer k>1 of binary integers of a vector of a biometric datum on at least one input wire of the arithmetic circuit, and the function F comprising at least m scalar products, m being a divider of length N of biometric data vectors, if the divider m is equal to 2 or 3, the arithmetic circuit comprises at least N/(k*m) multiplication operators connected to the input wires of the arithmetic circuit, a storage memory, and at least one addition operator, and evaluation of the arithmetic circuit iteratively comprises computation of each of the m scalar products by means of said N/(k*m) multiplication operators, storage of m results of computations of said scalar products in said storage memory and summation of said results by means of said addition operator, if the divider m is greater than or equal to 4, the arithmetic circuit comprises at least one first computation sub-circuit of the scalar product comprising N/(k*m) first multiplication operators connected to input wires of the arithmetic circuit and a first storage memory, and a second computation sub-circuit of the scalar product comprising N/(k*m) second multiplication operators connected to the input wires of the arithmetic circuit and a second storage memory, each one of said first and second computation sub-circuits being also connected to an output of the storage memory of the other one of said first and second computation sub-circuits, and evaluation of the arithmetic circuit iteratively comprises computation of each of the m scalar products by using alternatively one of said first and second computation sub-circuit to compute sum of the scalar product of values of the input wires of the used one of said first and second computation sub-circuits and value stored in the storage memory of the other one of said first and second computation sub-circuits, wherein said biometric identification method delegates to a remote entity a comparison of biometric datum in terms of a protocol of verifiable computations suitable for a real-time execution, when said computer program product is executed by a processor.

10. A biometric identification system comprising a client device and a remote computation device wherein:

said client device and said remote computation device each comprise a processor, an interface and a memory for performing steps of an identification method according to a biometric identification method of an entity, by a biometric identification system comprising a client device and a remote computation device, comprising:

computation of at least one matching value between at least one biometric datum of the entity u and at least one reference biometric datum u', by application of a function F to said biometric data, each of said data being a vector of N binary integers $u_i$ or $u'_i$ with $1 \leq i \leq N$, each integer being coded on n bits, said function F comprising a scalar product between a biometric datum of the entity and a reference biometric datum, said computation performing a non-interactive, publicly verifiable computation method comprising steps of:

representation of said function F in form of an arithmetic circuit comprising wires transporting values of the finite prime field $\mathbb{Z}_q$, with q a prime number, and connecting addition and multiplication operators, conversion of said arithmetic circuit into a polynomial representation, QAP (Quadratic Arithmetic Program) or multi-QAP, generation of a public evaluation key and of a public verification key as a function of said polynomial representation, obtaining by the remote computation device of the arithmetic circuit and of the public evaluation key, for each biometric datum of the entity, determination of at least one matching value between said biometric datum and at least one reference biometric datum by the remote computation device by evaluating the arithmetic circuit having as inputs the biometric datum of the entity and the reference biometric datum, for each determined matching value, generation by the remote computation device of a proof of correction of computation execution of matching value, so-called generated proof, from said polynomial representation, the public evaluation key and result of the evaluation of the arithmetic circuit, transmission by the remote computation device of matching values and generated proofs to the client device, verification of said generated proofs received by the client device by means of the public verification key, identification of the entity by the client device as the function of the matching values and result of said verification of the generated proofs, wherein:

representation of said function F comprises encoding an integer k>1 of binary integers of a vector of a biometric datum on at least one input wire of the arithmetic circuit, and the function F comprising at least m scalar products, m being a divider of length N of biometric data vectors, if the divider m is equal to 2 or 3, the arithmetic circuit comprises at least N/(k*m) multiplication operators connected to input wires of the arithmetic circuit, a storage memory, and at least one addition operator, and evaluation of the arithmetic circuit iteratively comprises computation of each of the m scalar products by means of said N/(k*m) multiplication operators, storage of m results of computations of said scalar products in said storage memory and summation of said results by means of said addition operator, if the divider m is greater than or equal to 4, the arithmetic circuit comprises at least one first computation sub-circuit of the scalar product comprising N/(k*m) first multiplication operators connected to input wires of the arithmetic circuit and a first storage memory, and a second computation sub-circuit of the scalar product comprising N/(k*m) second multiplication operators connected to the input wires of the arithmetic circuit and a second storage memory, each one of said first and second computation sub-circuits being also connected to an output of the storage memory of the other one of said first and second computation sub-circuits, and evaluation of the arithmetic circuit iteratively comprises computation of each of the m scalar products by using alternatively one of said first and second computation sub-circuit to compute sum of the scalar product of values of the input wires of the used one of said first and second computation sub-circuits and value stored in the storage memory of the other one of said first and second computation sub-circuits, wherein said biometric identification method delegates to a remote entity a comparison of biometric datum in terms of a protocol of verifiable computations suitable for a real-time execution.

* * * * *